United States Patent
Bhandarkar et al.

(10) Patent No.: US 9,340,629 B2
(45) Date of Patent: May 17, 2016

(54) POLYETHYLENE PRODUCTION WITH MULTIPLE POLYMERIZATION REACTORS

(71) Applicant: Chevron Phillips Chemical Company, LP, The Woodlands, TX (US)

(72) Inventors: Maruti Bhandarkar, Kingwood, TX (US); Elizabeth A Benham, Spring, TX (US); Rebecca A. Gonzales, Houston, TX (US); Scott E. Kufeld, Houston, TX (US); Joel A Mutchler, Kingwood, TX (US); Catherine M. Gill, Kingwood, TX (US); Thanh T. Nguyen, Sugar Land, TX (US); Timothy O. Odi, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 395 days.

(21) Appl. No.: 13/713,207

(22) Filed: Dec. 13, 2012

(65) Prior Publication Data

US 2014/0171602 A1    Jun. 19, 2014

(51) Int. Cl.
*C08F 2/14* (2006.01)
*C08F 2/38* (2006.01)
*C08F 10/02* (2006.01)
*C08F 110/02* (2006.01)

(52) U.S. Cl.
CPC ..................................... *C08F 10/02* (2013.01)

(58) Field of Classification Search
CPC ......... C08F 2/14; C08F 10/02; C08F 2500/24

USPC ............................... 526/64, 65, 909; 528/501
See application file for complete search history.

(56) References Cited

U.S. PATENT DOCUMENTS

| | | | |
|---|---|---|---|
| 6,225,421 B1 | 5/2001 | Promel et al. | |
| 6,239,235 B1 | 5/2001 | Hottovy et al. | |
| 6,533,988 B2 * | 3/2003 | Kallio et al. | 264/503 |
| 6,699,947 B1 | 3/2004 | Evertz et al. | |
| 7,033,545 B2 | 4/2006 | Kufeld et al. | |
| 7,718,732 B2 * | 5/2010 | Lee et al. | 525/52 |
| 7,957,947 B2 | 6/2011 | Odi | |
| 8,058,367 B2 | 11/2011 | Hottovy et al. | |
| 2008/0052058 A1 | 2/2008 | Odi et al. | |
| 2009/0124779 A1 | 5/2009 | Cousin et al. | |
| 2010/0130704 A1 | 5/2010 | Hottovy et al. | |
| 2011/0288247 A1 | 11/2011 | Hottovy et al. | |

FOREIGN PATENT DOCUMENTS

| | | |
|---|---|---|
| CA | 1019899 | * 10/1977 |
| WO | 2011097119 | 8/2011 |
| WO | 2012141974 | 10/2012 |

OTHER PUBLICATIONS

Mirzaei, et al, "Prepolymerization of Ethylene with a Ziegler-Natta Catalyst," Journal of Applied Polymer Sci., vol. 105, 2703-2711 (2007).*
International Patent Application PCT/US2013/073054 Search Report dated Jun. 3, 2014.

* cited by examiner

*Primary Examiner* — Fred M Teskin
(74) *Attorney, Agent, or Firm* — Monte R. Rhodes

(57) ABSTRACT

A technique for polymerizing ethylene on catalyst in a first polymerization reactor and in a second polymerization reactor to form polyethylene particles, and controlling particle size of the polyethylene particles.

38 Claims, 12 Drawing Sheets

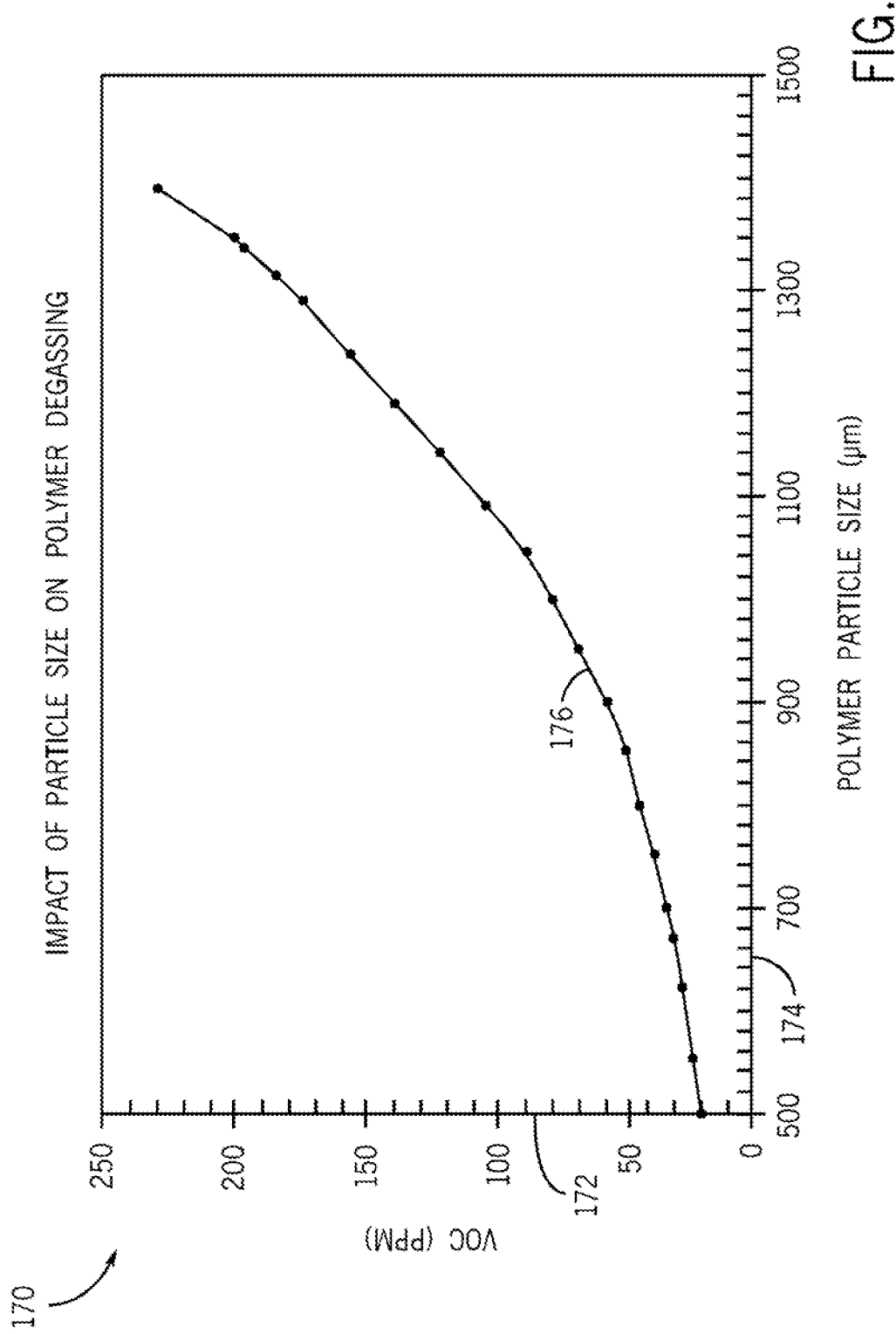

POLYETHYLENE PRODUCTION WITH MULTIPLE POLYMERIZATION REACTORS

BACKGROUND

1. Field of the Invention

The present invention relates generally to polyethylene production and, more specifically, to polyethylene particle size in the operation of a polyethylene polymerization reactor system having two or more polymerization reactors.

2. Description of the Related Art

This section is intended to introduce the reader to aspects of art that may be related to aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

As chemical and petrochemical technologies have advanced, the products of these technologies have become increasingly prevalent in society. In particular, as techniques for bonding simple molecular building blocks into longer chains (or polymers) have advanced, the polymer products, typically in the form of various plastics, have been increasingly incorporated into various everyday items. For example, polyethylene polymer and its copolymers are used for piping, retail and pharmaceutical packaging, food and beverage packaging, plastic bags, household items, various industrial products, and so forth.

Polyethylene may be produced from the monomer ethylene. If the sole monomer ethylene is used for polymerization, the polyethylene polymer is referred to as a homopolymer, while incorporation of different monomers in addition to ethylene creates a polyethylene copolymer or terpolymer, and so on. In polyethylene production, the comonomer 1-hexene is commonly used in addition to ethylene to control density of the polyethylene. The monomers (ethylene, 1-hexene, etc.) may be added to a polymerization reactor, such as a liquid-phase reactor or a gas-phase reactor, where they are converted to polymers. In the liquid-phase reactor, an inert hydrocarbon, such as isobutane, propane, n-pentane, i-pentane, neo-pentane, and/or n-hexane, may be utilized as a diluent to carry the contents of the reactor. A catalyst (e.g., Ziegler-Natta, metallocene, chromium-based, etc.) may also be added to the reactor to facilitate the polymerization reaction. Unlike the monomers, catalysts are generally not consumed in the polymerization reaction.

As polymer chains develop during polymerization, solid particles known as "fluff" or "flake" or "powder" are produced. The fluff may possess one or more melt, physical, rheological, and/or mechanical properties of interest, such as density, melt index (MI), comonomer content, molecular weight, and so on. Different properties for the fluff may be desirable depending on the application to which the polyethylene fluff or subsequently pelletized polyethylene fluff is to be applied. Control of the reaction conditions within the reactor, such as temperature, pressure, chemical concentrations, polymer production rate, catalyst type, and so forth, may affect the fluff properties.

In some circumstances, to increase capacity of a polymerization line or to achieve certain desired polymer characteristics, the polymerization conditions may benefit from employing more than one polyethylene polymerization reactor, with each reactor having its own set of conditions. The reactor conditions, including the polymerization recipe, can be set and maintained such that polyethylene polymer product is monomodal, bimodal, or multimodal. In the case of bimodal or multimodal polymers, at least two polyethylene polymers, each having a different molecular weight fraction, for instance, may be combined into one polymer product. In a general sense, a polyethylene produced in each reactor will be suspended in a diluent to form a slurry. The reactors may be connected in series, such that the slurry from one reactor may be transferred to a subsequent reactor, and so forth, until a polyethylene polymer is produced discharging from the final reactor with the desired set of characteristics. For example, a bimodal polymer may be produced by two reactors in series, a trimodal polymer may need three, and so on.

The competitive business of polyethylene production drives manufacturers in the continuous improvement of their processes in order to lower production costs, improve product quality, and address environmental concerns, and so on. In an industry where billions of pounds of polyethylene product are produced per year, small incremental improvements, such as in reactor stability and operability, monomer and diluent recovery, and the like, can result in significant economic benefit and environmental progress, and so forth.

SUMMARY OF THE INVENTION

An aspect of the invention relates to a method of operating a polyethylene reactor system, including: polymerizing ethylene on catalyst in a first polymerization reactor to form intermediate particles having the catalyst and a first polyethylene; discharging the intermediate particles from the first polymerization reactor to a second polymerization reactor; polymerizing ethylene on the catalyst in the intermediate particles in the second polymerization reactor to form product particles having the catalyst, the first polyethylene, and the second polyethylene; discharging the product particles from the second polymerization reactor, and controlling a particle size of the product particles by adjusting a residence time of the catalyst through the first polymerization reactor and/or the second polymerization reactor.

Another aspect of the invention relates to a method of operating a polyethylene reactor system, including: polymerizing ethylene on a catalyst in a first polymerization reactor to form a first polyethylene and to form intermediate polyethylene particles comprising the catalyst and the first polyethylene; discharging the intermediate polyethylene particles from the first polymerization reactor to a second polymerization reactor; polymerizing ethylene on the catalyst in the second polymerization reactor to form a second polyethylene and to form product polyethylene particles comprising the catalyst, the first polyethylene, and the second polyethylene; discharging the product polyethylene particles from the second polymerization reactor, and controlling a particle size of the product polyethylene particles by adjusting activity of the catalyst in the first polymerization reactor and/or in the second polymerization reactor.

Yet another aspect of the invention relates to a method of increasing efficiency of separating residual hydrocarbon from polyethylene particles in a purge vessel, including: polymerizing ethylene on a catalyst in a reactor system to form polyethylene particles, the reactor system comprising a first polymerization reactor and a second polymerization reactor in series; discharging the polyethylene particles from the second polymerization reactor to a separation vessel to separate hydrocarbon from the polyethylene particles; discharging the polyethylene particles from the flash vessel to a purge vessel to separate residual hydrocarbon from the polyethylene particles; and adjusting a particle size of the polyethylene particles discharging from the second polymerization reactor to increase separation of residual hydrocarbon from polyethylene particles in a downstream purge vessel.

BRIEF DESCRIPTION OF THE DRAWINGS

Advantages of the invention may become apparent upon reading the following detailed description and upon reference to the drawings in which:

FIG. 7 is a plot of exemplary model results of volatile organic carbon (VOC) in a polyolefin fluff stream discharged from a purge column:

DETAILED DESCRIPTION OF SPECIFIC EMBODIMENTS

Figure 1:
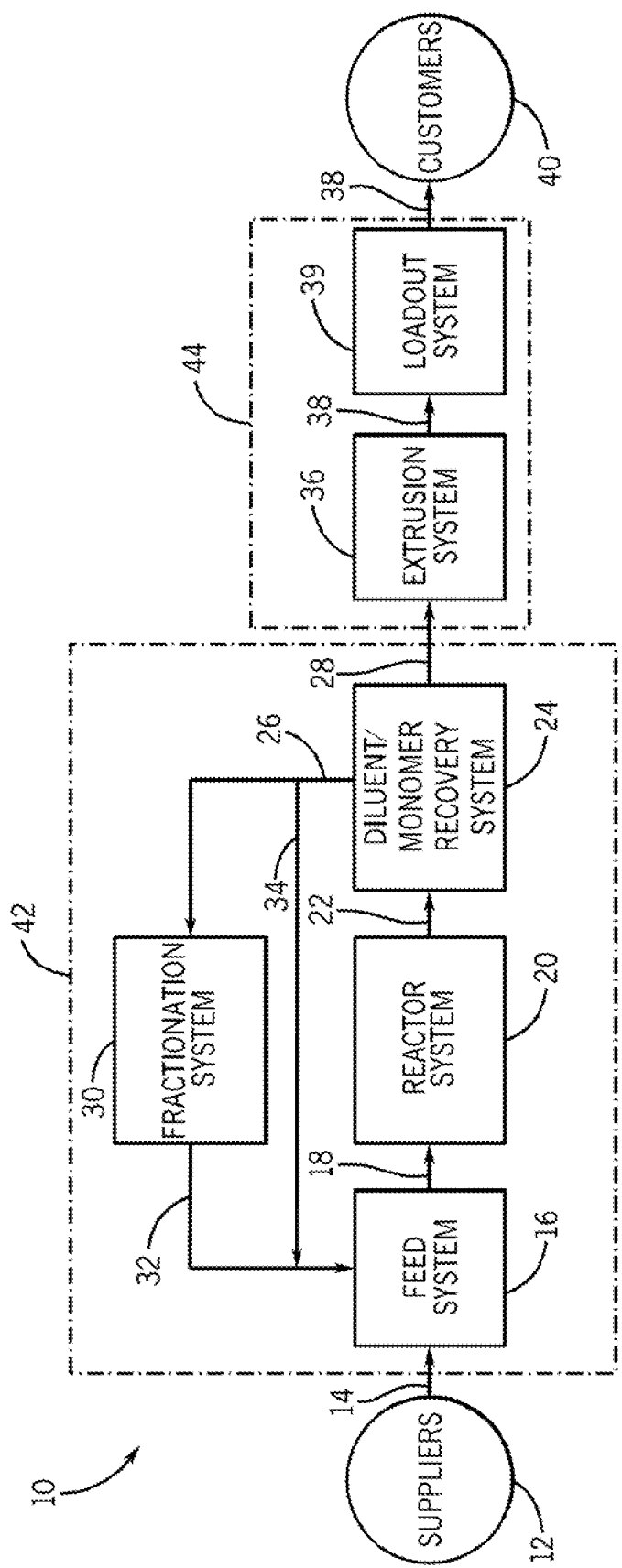
FIG. 1 is a block flow diagram depicting an exemplary polyethylene production system for producing polyethylene in accordance with embodiments of the present techniques.

One or more specific embodiments of the present invention will be described below. To provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill in the art and having the benefit of this disclosure.

Embodiments of the present techniques relate to controlling or adjusting particle size, e.g., mean (average) particle size, median (middle) particle size, particle size distribution, and so forth, of polyethylene fluff formed in the polymerization reactor. Such control and adjustment of particle size may improve reactor stability and operability, as well as beneficially increase separation of residual hydrocarbon or volatile organic compounds (VOC) from the polyethylene fluff in downstream processing. Indeed, the present techniques recognize that fluff particle size influences circulation in the reactors, slurry transfer between the reactors, and downstream degassing efficiency, and the like.

With regard to improved reactor circulation and operability, the controlling or optimizing the fluff particle size may beneficially improve slurry flow and hydraulics, for example, by impacting the nature of the fluff solids, the apparent viscosity of the fluff slurry, the settling or saltation velocity of the fluff slurry, and so on. For instance, increasing the particle size may generally decrease the total solid surface area and thus may decrease the apparent slurry viscosity, beneficially requiring less loop pump head to circulate the slurry which may improve reactor stability. Other examples and reasons for improved reactor operation related to mean or median particle size, particle size distribution, etc. may be realized. In all, control of fluff particle size may provide for a more stable reactor and transfer operation, resulting in less reactor downtime, less off-spec production, increased polyethylene quality, lower reactor transition times between polyethylene grades, and so on.

As for controlling or adjusting particle size to increase separation of residual hydrocarbon from the polyethylene fluff, the increased separation may beneficially provide for less hydrocarbon carryover with the polyethylene fluff to the extrusion area of the manufacturing facility. In certain instances, decreasing fluff particle size may increase the separation efficiency or amount of residual hydrocarbon separated from the fluff. Further, whether the particle distribution is narrow or broad may improve separation. In all, with increased separation resulting from particle size control, more diluent may be recovered, and environmental compliance improved, and so on.

In sum, it may be beneficial to regulate the particle size of the polyethylene fluff particles produced in the polymerization reactors. Selection of the optimum or set point for fluff particle size (e.g., mean or median particle size and the breadth of the particle size distribution) may be impacted by reactor conditions including operating conditions and the recipe, the polyethylene product type, and so on.

The polymer particle size may be correlated with reactor residence time, catalyst activity, catalyst diameter, catalyst tendency to fracture, catalyst particle density, and so forth. The present techniques may control or alter particle size of the polyethylene fluff by adjusting catalyst residence time and/or adjusting catalyst activity in the polymerization reactors. Further, catalyst selection may be directed to regulating particle size of the polyethylene fluff. As discussed below, a variety of techniques for controlling or adjusting polyethylene fluff particle size may be implemented.

1. Polyethylene Production

Turning now to the drawings, and referring initially to FIG. 1, a block diagram depicts an exemplary production system 10 for producing the polyolefin polyethylene. The exemplary production system 10 is typically a continuous operation but may include both continuous and batch systems. An exemplary nominal capacity for the exemplary production system 10 is about 700-1400 million pounds of polyethylene produced per year. Exemplary hourly design rates are approximately 70,000 to 150,000 pounds of polymerized/extruded polyethylene per hour. It should be emphasized, however, that the present techniques apply to polyolefin manufacturing processes including polyethylene production systems having nominal capacities and design rates outside of these exemplary ranges.

Various suppliers 12 may provide reactor feedstocks 14 to the production system 10 via pipelines, ships, trucks, cylinders, drums, and so forth. The suppliers 12 may include off-site and/or on-site facilities, including olefin plants, refineries, catalyst plants, and the like. Examples of possible feedstocks include olefin monomers and comonomers (such as ethylene, propylene, butene, hexene, octene, and decene), diluents (such as propane, isobutane, n-butane, n-hexane, and n-heptane), chain transfer agents (such as hydrogen), catalysts (such as Ziegler-Natta catalysts, chromium catalysts, and metallocene catalysts) which may be heterogeneous, homogenous, supported, unsupported, and co-catalysts such as, triethylboron, organoaluminum compounds, methyl aluminoxane (MAO), triethylaluminum (TEAl), borates, TiBAL, etc., and activators such as super solid acids, and other additives. In the case of ethylene monomer, exemplary ethylene feedstock may be supplied via pipeline at approximately 800-1450 pounds per square inch gauge (psig) at 45-65° F. Exemplary hydrogen feedstock may also be supplied via pipeline, but at approximately 900-1000 psig at 90-110° F. Of course, a variety of supply conditions may exist for ethylene, hydrogen, and other feedstocks 14.

The suppliers 12 typically provide feedstocks 14 to a reactor feed system 16, where the feedstocks 14 may be stored, such as in monomer storage and feed tanks, diluent vessels, catalyst tanks, co-catalyst cylinders and tanks, and so forth. In the case of ethylene monomer feed, the ethylene may be fed to the polymerization reactors without intermediate storage in the feed system 16 in certain embodiments. In the system 16, the feedstocks 14 may be treated or processed prior to their introduction as feed 18 into the polymerization reactors. For example, feedstocks 14, such as monomer, comonomer, and diluent, may be sent through treatment beds (e.g., molecular sieve beds, aluminum packing, etc.) to remove catalyst poisons. Such catalyst poisons may include, for example, water, oxygen, carbon monoxide, carbon dioxide, and organic compounds containing sulfur, oxygen, or halogens. The olefin monomer and comonomers may be liquid, gaseous, or a supercritical fluid, depending on the type of reactor being fed. Also, it should be noted that typically only a relatively small amount of fresh make-up diluent as feedstock 14 is utilized, with a majority of the diluent fed to the polymerization reactor recovered from the reactor effluent.

The feed system 16 may prepare or condition other feedstocks 14, such as catalysts, for addition to the polymerization reactors. For example, a catalyst may be prepared and then mixed with diluent (e.g., isobutane or hexane) or mineral oil in catalyst preparation tanks. Further, the feed system 16 typically provides for metering and controlling the addition rate of the feedstocks 14 into the polymerization reactor to maintain the desired reactor stability and/or to achieve the desired polyolefin properties or production rate. Furthermore, in operation, the feed system 16 may also store, treat, and meter recovered reactor effluent for recycle to the reactor. Indeed, operations in the feed system 16 generally receive both feedstock 14 and recovered reactor effluent streams. In total, the feedstocks 14 and recovered reactor effluent are processed in the feed system 16 and fed as feed streams 18 (e.g., streams of monomer ethylene, comonomer, diluent, catalysts, co-catalysts, hydrogen, additives, or combinations thereof) to the reactor system 20. As discussed below, the streams 18 may be delivered in feed conduits to the reactor which tap into the wall of the polymerization reactor in the reactor system 20.

The reactor system 20 may have one or more reactor vessels, such as liquid-phase or gas-phase reactors. If multiple reactors are employed, the reactors may be arranged in series, in parallel, or in other combinations or configurations. In the polymerization reactor vessels, one or more olefin monomers (e.g., ethylene) and optionally comonomers (e.g., 1-hexene) are polymerized to form product polymer particulates, typically called fluff or granules. The fluff may possess one or more melt, physical, rheological, and/or mechanical properties of interest, such as density, melt index (MI), molecular weight, copolymer or comonomer content, modulus, and the like. The reaction conditions, such as temperature, pressure, flow rate, mechanical agitation, product takeoff, component concentrations, catalyst type, polymer production rate, and so forth, may be selected to achieve the desired fluff properties.

In addition to the one or more olefin monomers, a catalyst that facilitates polymerization of the ethylene monomer is typically added to the reactor. The catalyst may be a particle suspended in the fluid medium within the reactor. In general, Ziegler catalysts. Ziegler-Natta catalysts, metallocenes, and other well-known polyolefin catalysts, as well as co-catalysts, may be used. An example of a particular catalyst is a chromium oxide catalyst containing hexavalent chromium on a silica support. Typically, an olefin free diluent or mineral oil, for example, is used in the preparation and/or delivery of the catalyst in a feed conduit that taps into the wall of the polymerization reactor. Further, diluent may be fed into the reactor, typically a liquid-phase reactor. The diluent may be an inert hydrocarbon that is liquid at reaction conditions, such as isobutane, propane, n-butane, n-pentane, i-pentane, neopentane, n-hexane, cyclohexane, cyclopentane, methylcyclopentane, ethylcyclohexane, and the like. The purpose of the diluent is generally to suspend the catalyst particles and polymer within the reactor. Diluent, as indicated, may also be used for reactor or line flushes to mitigate plugging or fouling, to facilitate flow of the polymer slurry in lines, and so on.

A motive device may be present within each of the one or more reactors in the reactor system 20. For example, within a liquid-phase reactor, such as a loop slurry reactor, an impeller may create a mixing zone within the fluid medium. The impeller may be driven by a motor to propel the fluid medium as well as any catalyst, polyolefin fluff, or other solid particulates suspended within the fluid medium, through the closed loop of the reactor. Similarly, within a gas-phase reactor, such as a fluidized bed reactor or plug flow reactor, one or more paddles or stirrers may be used to mix the solid particles within the reactor.

The discharge of polyethylene fluff product slurry 22 of the reactors from system 20 may include the polymer polyethylene fluff as well as non-polymer components, such as diluent, unreacted monomer/comonomer, and residual catalyst. In construction of the reactors in certain embodiments, a discharge nozzle and conduit may be installed (e.g., welded) at a tap or hole cut into the reactor wall. The discharge of the fluff product slurry 22 exiting the reactor (e.g., the final reactor in a series of reactors) through the discharge nozzle may be subsequently processed, such as by a diluent/monomer recovery system 24.

The diluent/monomer recovery system 24 may process the fluff product slurry 22 from the reactor system 20 to separate non-polymer components 26 (e.g., diluent and unreacted monomer) from the polymer fluff 28. The diluent/monomer may be flashed in recovery system 24 to separate the diluent/monomer from the fluff 28.

A fractionation system 30 may process the untreated recovered non-polymer components 26 (e.g., diluent/monomer) to remove undesirable heavy and light components and to produce olefin-free diluent, for example. Fractionated product streams 32 may then return to the reactor system 20 either directly (not shown) or via the feed system 16. Such olefin-free diluent may be employed in catalyst preparation/delivery in the feed system 16 and as reactor or line flushes in the reactor system 20.

A portion or all of the non-polymer components 26 may bypass the fractionation system 30 and more directly recycle to the reactor system (not shown) or the feed system 16, as indicated by reference numeral 34. In certain embodiments, up to 80-95% of the diluent discharged from the reactor system 20 bypasses the fractionation system 30 in route to the polymerization feed system 16 (and ultimately the reactor system 20). Moreover, although not illustrated, polymer granules intermediate in the recovery system 24 and typically containing active residual catalyst may be returned to the reactor system 20 for further polymerization, such as in a different type of reactor or under different reaction conditions.

The polyethylene fluff 28 discharging from the diluent/monomer recovery system 24 may be extruded into polyethylene pellets 38 in an extrusion system 36. In the extrusion system 36, the fluff 28 is typically extruded to produce polymer pellets 38 with the desired mechanical, physical, and melt characteristics. Extruder feed may include additives, such as UV inhibitors, antioxidants and peroxides, which are added to the fluff products 28 to impart desired characteristics to the extruded polymer pellets 32. An extruder/pelletizer receives the extruder feed including one or more fluff products 28 and whatever additives have been added. The extruder/pelletizer heats and melts the extruder feed which then may be extruded (e.g., via a twin screw extruder) through a pelletizer die under pressure to form polyolefin pellets. Such pellets are typically cooled in a water system disposed at or near the discharge of the pelletizer.

A loadout system 39 may prepare the pellets 38 for shipment in to customers 40. In general, the polyolefin pellets 38 may be transported from the extrusion system 36 to a product load-out area 39 where the pellets 38 may be stored, blended with other pellets, and/or loaded into railcars, trucks, bags, and so forth, for distribution to customers 40. Polyethylene pellets 38 shipped to customers 40 may include low density polyethylene (LDPE), linear low density polyethylene (LLDPE), medium density polyethylene (MDPE), high density polyethylene (HDPE), enhanced polyethylene, and so on.

The polymerization and diluent recovery portions of the polyethylene production system 10 may be called the "wet" end 42 or alternatively "reaction" side of the process 10. The extrusion 38 and loadout 39 systems of the polyethylene production system 10 may be called the "dry" end 44 or alternatively "finishing" side of the polyolefin process 10.

Polyolefin (e.g., polyethylene) pellets 38 may be used in the manufacturing of a variety of products, components, household items and other items, including adhesives (e.g., hot-melt adhesive applications), electrical wire and cable, agricultural films, shrink film, stretch film, food packaging films, flexible food packaging, milk containers, frozen-food packaging, trash and can liners, grocery bags, heavy-duty sacks, plastic bottles, safety equipment, coatings, toys and an array of containers and plastic products. To form the end-products or components from the pellets 38 prior to distribution, the pellets are generally subjected to processing, such as blow molding, injection molding, rotational molding, blown film, cast film, extrusion (e.g., sheet extrusion, pipe and corrugated extrusion, coating/lamination extrusion, etc.), and so on. Ultimately, the products and components formed from polyolefin (e.g., polyethylene) pellets 38 may be further processed and assembled for distribution and sale to the consumer. For example, extruded polyethylene pipe or film may be packaged for distribution to the consumer, or a fuel tank comprising polyethylene may be assembled into an automobile for distribution and sale to the consumer, and so on.

Process variables in the polyethylene production system 10 may be controlled automatically and/or manually via valve configurations, control systems, and so on. In general, a control system, such as a processor-based system, may facilitate management of a range of operations in the polyethylene production system 10, such as those represented in FIG. 1. Polyolefin manufacturing facilities may include a central control room or location, as well as a central control system, such as a distributed control system (DCS) and/or programmable logic controller (PLC). Of course, the reactor system 20 typically employs a processor-based system, such as a DCS, and may also employ advanced process control known in the art. The feed system 16, diluent/monomer recovery 24, and fractionation system 30 may also be controlled by the DCS. In the dry end of the plant, the extruder and/or pellet loading operations may also be controlled via a processor-based system (e.g., DCS or PLC).

The DCS and associated control system(s) in the polyethylene production system 10 may include the appropriate hardware, software logic and code, to interface with the various process equipment, control valves, conduits, instrumentation, etc., to facilitate measurement and control of process variables, to implement control schemes, to perform calculations, and so on. A variety of instrumentation known to those of ordinary skill in the art may be provided to measure process variables, such as pressure, temperature, flow rate, and so on, and to transmit a signal to the control system, where the measured data may be read by an operator and/or used as an input in various control functions. Depending on the application and other factors, indication of the process variables may be read locally or remotely by an operator, and used for a variety of control purposes via the control system.

A polyolefin manufacturing facility typically has a control room from which the plant manager, engineer, technician, supervisor and/or operator, and so on, monitors and controls the process. When using a DCS, the control room may be the center of activity, facilitating the effective monitoring and control of the process or facility. The control room and DCS may contain a Human Machine Interface (HMI), which is a computer, for example, that runs specialized software to provide a user-interface for the control system. The HMI may vary by vendor and present the user with a graphical version of the remote process. There may be multiple HMI consoles or workstations, with varying degrees of access to data.

II. Polymerization Reactor System

As discussed above, the reactor system 20 may include one or more polymerization reactors, which may in turn be of the same or different types. Furthermore, with multiple reactors, the reactors may be arranged serially or in parallel. Whatever the reactor types in the reactor system 20, a polyolefin particulate product, generically referred to as "fluff" herein, is produced. To facilitate explanation, the following examples are limited in scope to specific reactor types believed to be familiar to those skilled in the art and to combinations. To one of ordinary skill in the art using this disclosure, however, the present techniques are applicable to more complex reactor arrangements, such as those involving additional reactors, different reactor types, and/or alternative ordering of the reactors or reactor types, as well as various diluent and monomer recovery systems and equipment disposed between or among the reactors, and so on. Such arrangements are considered to be well within the scope of the present invention.

One reactor type include reactors within which polymerization occurs within a liquid phase. Examples of such liquid phase reactors include autoclaves, boiling liquid-pool reactors, loop slurry reactors (vertical or horizontal), and so forth. For simplicity, a loop slurry reactor which produces polyolefin, such as polyethylene, is discussed in the present context though it is to be understood that the present techniques may be similarly applicable to other types of liquid phase reactors.

Figure 2:
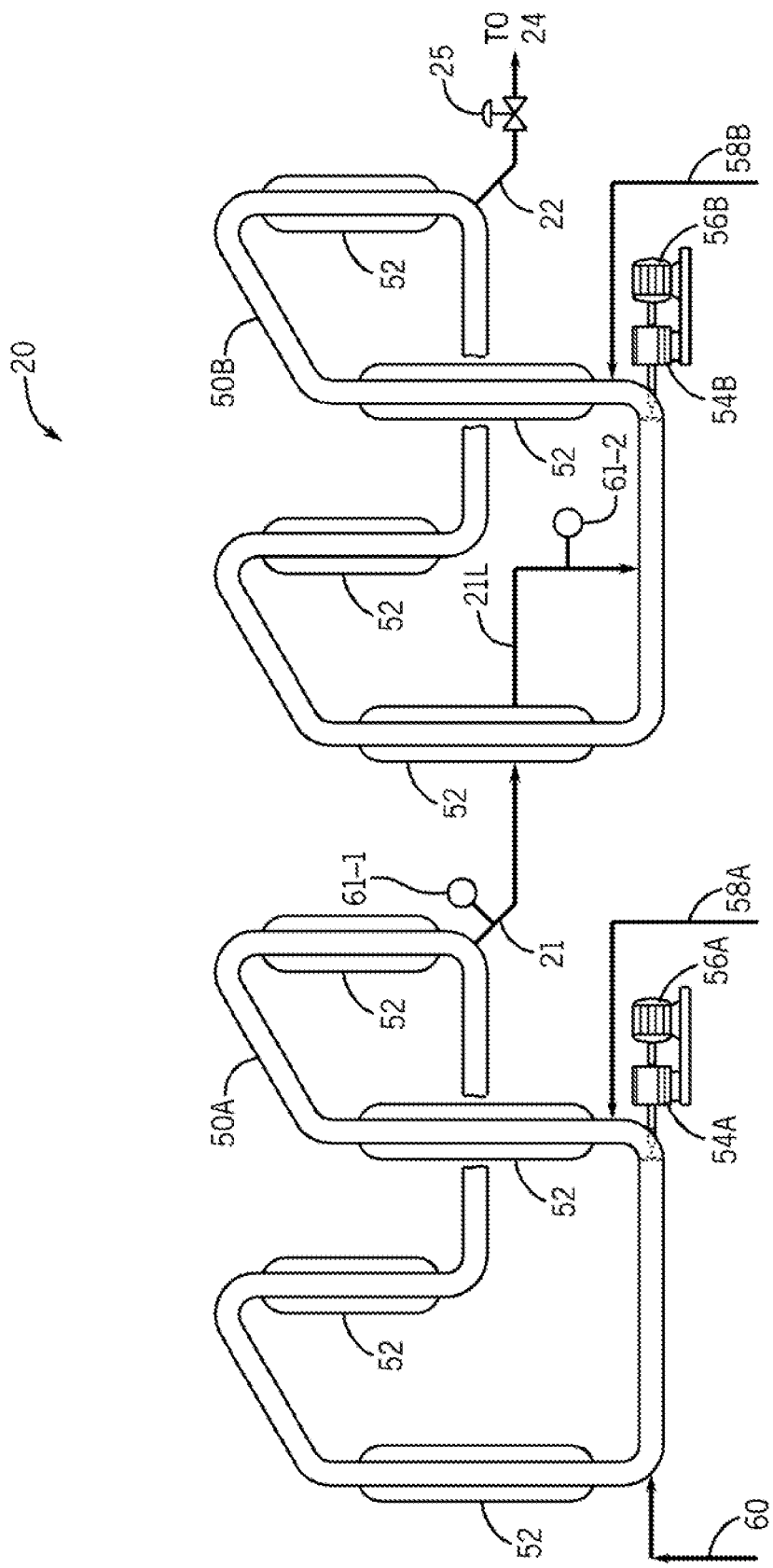
FIG. 2 is a process flow diagram of an exemplary reactor system of the polyethylene production system of FIG. 1 in accordance with embodiments of the present techniques.

FIG. 2 depicts an exemplary polymerization reactor system 20 (of FIG. 1) as having two loop slurry (polymerization) reactors 50A, 50B disposed and operated in series. Of course, additional loop reactors or other reactors (e.g., gas phase reactors) may be disposed in series or parallel in the illustrated combination. Moreover, in alternate embodiments, processing equipment may be disposed between the two loop reactors 50A, 50B (see FIG. 10 and FIG. 11, for example). Further, the operational configuration of the two depicted loop reactors 50 may be shifted to a parallel operation. Indeed, the present techniques contemplate a variety of reactor system configurations such as those disclosed in U.S. Patent Application No. 2011/0288247 which is incorporated by reference herein in its entirety.

loop slurry reactor 50A, 50B is generally composed of segments of pipe connected by smooth bends or elbows. The representation of the loop reactors 50A, 50B in FIG. 2 is simplified, as appreciated by the skilled artisan. Indeed, an exemplary reactor 50A, 50B configuration may include eight to sixteen or other number of jacketed vertical pipe legs, approximately 24 inches in diameter and approximately 200 feet in length, connected by pipe elbows at the top and bottom of the legs. FIG. 2 shows a four leg segment reactor arranged vertically. It could also be arranged horizontally. The reactor jackets 52 are normally provided to remove heat from the exothermic polymerization via circulation of a cooling medium, such as treated water, through the reactor jackets 52.

The reactors 50A, 50B may be used to carry out polyolefin (e.g., polyethylene) polymerization under slurry conditions in which insoluble particles of polyolefin (e.g., polyethylene) are formed in a fluid medium and are suspended as slurry until removed. A respective motive device, such as pump 54A, 54B, circulates the fluid slurry in each reactor 50A, 50B. An example of a pump 54A, 54B is an in-line axial flow pump with the pump impeller disposed within the interior of the reactor 50A, 50B to create a turbulent mixing zone within the fluid medium. The impeller may also assist in propelling the fluid medium through the closed loop of the reactor at sufficient speed to keep solid particulates, such as the catalyst or polyolefin product, suspended within the fluid medium. The impeller may be driven by a motor 56A, 56B or other motive force.

The fluid medium within each reactor 50 may include olefin monomers and comonomers, diluent, co-catalysts (e.g., alkyls, triethylboron, TiBAL, TEAl, methyl aluminoxane or MAO, borates, TEB, etc.), molecular weight control agents (e.g., hydrogen), and any other desired co-reactants or additives. Such olefin monomers and comonomers are generally 1-olefins having up to 10 carbon atoms per molecule and typically no branching nearer the double bond than the 4-position. Examples of monomers and comonomers include ethylene, propylene, butene, 1-pentene, 1-hexene, 1-octene, and 1-decene. Again, typical diluents are hydrocarbons which are inert and liquid under reaction conditions, and include, for example, isobutane, propane, n-butane, n-pentane, i-pentane, neopentane, n-hexane, cyclohexane, cyclopentane, methylcyclopentane, ethylcyclohexane, and the like. These components are added to the reactor interior via inlets or conduits at specified locations, such as depicted at feed streams 58A, 58B, which generally corresponds to one of the feed streams 18 of FIG. 1.

Likewise, a catalyst, such as those previously discussed, may be added to the reactor 50A via a conduit at a suitable location, such as depicted at feed stream 60, which may include a diluent carrier and which also generally corresponds to one of the feed streams 18 of FIG. 1. Again, the conduits that feed the various components tie-in (i.e., flange or weld) to the reactor 50. In the illustrated embodiment, catalyst feed 60 is added to the first reactor 50A in series but not to the second reactor 50B. However, active catalyst may discharge in a fluff slurry 21 from the first reactor 50A to the second reactor 50B. Moreover, while not depicted, a fresh catalyst 60 may be added to the second reactor 50B in certain embodiments. In total, the added components including the catalyst and other feed components generally compose a fluid medium within the reactor 50A. 50B in which the catalyst is a suspended particle.

The reaction conditions, such as temperature, pressure, and reactant concentrations, in each reactor 50 are regulated to facilitate the desired properties and production rate of the polyolefin in the reactor, to control stability of the reactor, and the like. Temperature is typically maintained below that level at which the polymer product would go into solution, swell, soften, or become sticky. As indicated, due to the exothermic nature of the polymerization reaction, a cooling fluid may be circulated through jackets 52 around portions of the loop slurry reactor 50A, 50B to remove excess heat, thereby maintaining the temperature within the desired range, generally between 150° F. to 250° F. (65° C. to 121° C.). Likewise, pressure in each loop reactor 50A, 50B may be regulated within a desired pressure range, generally 100 to 800 psig, with a range of 450-700 psig being typical.

As the polymerization reaction proceeds within each reactor 50, the monomer (e.g., ethylene) and comonomers (e.g., 1-hexene) polymerize to form polyolefin (e.g., polyethylene) polymers that are substantially insoluble in the fluid medium at the reaction temperature, thereby forming a slurry of solid particulates within the medium. These solid polyolefin particulates may be removed from each reactor 50A, 50B via a settling leg or other means, or a continuous take-off (CTO), and so on.

As mentioned, FIG. 2 depicts two loop reactors 50A, 50B in series. The two loop reactors 50A, 50B may be operated such that the polyethylene fluff in the fluff slurry 22 discharging from the second reactor 50B is monomodal or bimodal. In certain cases of monomodal production, the reactor operating conditions may be set such that essentially the same polyethylene is polymerized in each reactor 50A, 50B. On the other hand, in the case of bimodal production, the reactor operating conditions may be set such that the polyethylene polymerized in the first reactor 50A is different than the polyethylene polymerized in the second reactor 50B. Thus, with two reactors, a first polyethylene produced in the first loop reactor 50A and the second polyethylene produced in the second loop reactor 50B may combine to give a bimodal polyethylene or a monomodal polyethylene.

Operation of the two loop reactors 50A, 50B may include feeding more comonomer to the first polymerization reactor than to the second polymerization rector, or vice versa. The operation may also include feeding more hydrogen to the second polymerization reactor than the second reactor, or vice versa. Of course the same amount of comonomer and/or the same amount of hydrogen may be fed to each reactor 50A, 50B. Further, the same or different comonomer concentration may be maintained in each reactor 50. Likewise, the same or different hydrogen concentration may be maintained in each reactor 50A, 50B. Furthermore, the first polyethylene (i.e., polyethylene polymerized in the first reactor 50A) may have a first range for a physical property, and the second polyethylene (i.e., polyethylene polymerized in the second reactor 50B) may have a second range for the physical property. The first range and the second range may be the same or different. Exemplary physical properties include polyethylene density, comonomer percentage, short chain branching amount, molecular weight, viscosity, melt index, and the like.

As indicated, the polyethylene product fluff slurry 22 discharges from the second reactor 50B and is subjected to downstream processing, such as in a diluent/monomer recovery system 24 (FIG. 1). The product fluff slurry 22 may discharge through a settling leg, a continuous take-off (CTO), or other valve configurations. The product fluff slurry 22 may discharge intermittently such as through a settling leg configuration, or instead may discharge continuously. A variety of discharge configurations are contemplated for a continuous discharge. Employment of an isolation valve (e.g., full-bore Ram valve) without an accompanying modulating valve may provide for continuous discharge of slurry from the loop reactor. Further, a CTO is defined as a continuous discharge having at least a modulating flow valve, and provides for a continuous discharge of slurry from the loop reactor. In certain examples, a CTO has an isolation valve (e.g., Ram valve) at the reactor wall and a modulating valve (e.g., v-ball valve) on the discharge conduit. A Ram valve in a closed position may beneficially provide a surface that is flush with the inner wall of the reactor to preclude the presence of a cavity, space, or void for polymer to collect when the Ram valve is in the closed position.

In operation, depending on the positioning of the discharge on the reactor, for example, a discharge slurry 22 having a greater solids concentration than the slurry circulating in the reactor 50B may be realized with a discharge configuration having an isolation valve (Ram valve) alone, or having a CTO configuration with an isolation valve (Ram valve) and modulating valve 25. Exemplary CTO configurations and control, and other discharge configurations, may be found in the aforementioned U.S. Patent Application No. 2011/0288247, and in U.S. Pat. No. 6,239,235 which is also incorporated herein by reference in its entirety.

In the illustrated embodiment, the product fluff slurry 22 discharges through a CTO. In certain examples, a CTO has a Ram valve at the reactor 50B wall, and a modulating flow control valve 25 (e.g., v-ball control valve) on the discharge conduit. Again, however, in an alternate embodiment, the product fluff slurry 22 may discharge through a settling leg configuration, for example, in lieu of a CTO.

A transfer fluff slurry 21 discharges from the first loop reactor 50A to the second loop reactor 50B via a transfer line 21L. The contents of transfer fluff slurry 21 may be representative of the contents of the first loop reactor 50A. However, the solids concentration may be greater in the transfer slurry 21 than in the first loop reactor 50A, depending on the positioning of the inlet of the transfer line 21L on the first loop reactor 50A, for example, and other considerations. The transfer fluff slurry 21 may discharge from the first loop reactor 50A into the transfer line 21L through a settling leg, an isolation valve (e.g., a Ram valve), a continuous take-off (which the CTO has an isolation or Ram valve and a modulating valve), or other valve configuration. In the illustrated embodiment, the discharge of the transfer slurry 21 from the first loop reactor 50A is continuous and not directly modulated. A CTO or settling leg is not employed. Instead, the transfer slurry 21 discharges through an isolation valve or Ram valve (not shown) on the transfer line 21L at the reactor wall and without a modulating valve in this example. In a particular example, the transfer slurry 21 discharges through a full-bore Ram valve maintained in a full-open position, and not additionally through a modulating valve.

The Ram valve may provide for isolation of the transfer line 2 IL from the loop reactor 50A when such isolation is desired. A Ram valve may also be positioned at the outlet of the transfer line 21L at the wall of the second loop reactor 50B to provide for isolation of the transfer line 21L from the second loop reactor 50B when such isolation is desired. It may be desired to isolate the transfer line 21L from the first and second loop reactors 50A, 50B during maintenance or downtime of the reactor system 20, or when an alternate transfer line is placed in service, and so on. The operation or control of the Ram valves may be manual, hydraulic-assisted, air-assisted, remote, automated, and so on. The transfer line 21L may be manually removed from service (e.g., manually closing the Ram valves) or automatically removed (e.g., via a control system automatically closing the Ram valves) from service.

Control of pressure (and throughput) in the first loop reactor 50A and the second loop reactor 50B may be facilitated by operation of the CTO flow control valve 25. In some examples, the pressure in the first loop reactor 50A may float on the pressure in the second loop reactor 50B. The reactors 50A, 50B may be maintained at the same, similar, or different pressure. Pressure elements or instruments may be disposed on the reactors 50A, 50B and on the transfer line 21L. Further, other process variable elements or instruments indicating temperature, flow rate, slurry density, and so forth, may also be so disposed.

Such instrumentation may include a sensor or sensing element, a transmitter, and so forth. For a pressure element, the sensing element may include a diaphragm, for example. For a temperature element or instrument, the sensing element may include a thermocouple, a resistance temperature detector (RTD), and the like, of which may be housed in a thermowell, for instance. Transmitters may convert a received analog signal from the sensing element to a digital signal for feed or transmission to a control system, for example. Of course the various instruments may have local indication of the sense variable. For instance, a pressure element or instrument may be or have a local pressure gauge and a temperature element or instrument may be or have a local temperature gauge, both of which may be read locally by an operator or engineer, for example.

The inlet position of the transfer line 21L may couple to the first loop reactor 50A on the discharge side of the circulation pump 56A in the first loop reactor 50A. The outlet position of the transfer line 21L may couple to the second loop reactor on the suction side of the circulation pump 56B in the second loop reactor 501B. Such a configuration may provide a positive pressure differential (i.e., a driving force) for flow of transfer slurry 21 through the transfer line 21L from the first loop reactor 50A to the second loop reactor 50B. In one example, a typical pressure differential (provided from the discharge of the first pump 54A to the suction of the second pump 54B) is about 20 pounds per square inch (psi). In certain examples, pressure elements 61-1 and 61-2 that indicate pressure may be disposed on the transfer line 21L, and may be situated to determine differential pressure across the transfer line 21L, for instance.

III. Diluent/Monomer Recovery System

At the outset, it should be emphasized that the diluent/monomer recovery system 24 (FIG. 1 and FIG. 3) discussed herein and that receives and processes the discharge slurry 22 from the reactor system 20 is given as exemplary. Indeed, a variety of other equipment, configurations and unit operations may be employed to remove or separate diluent, monomer, and other components from the polyethylene product fluff slurry 22. Moreover, according to the present techniques, controlling particle size of the polyethylene fluff in the slurry 22 discharging from the reactor system 20 may be beneficial in a variety of unit operations that separate hydrocarbon (e.g., diluent, monomer, etc.) or residual hydrocarbon from polyethylene fluff. Generally, the smaller the particle size (e.g., smaller mean particle size, smaller median particle size), the less the residual hydrocarbon or VOC that remains in the polyethylene fluff (e.g., after the fluff is subjected to a purge column or other separation operation). In other words, generally the smaller the particle size, the more residual hydrocarbon or VOC that may be removed in the separation. (See FIG. 7 as an example.) Such increased efficiency of residual hydrocarbon or VOC removal may be related to the increased surface area to volume ratio of the smaller particles, to less porosity volume of the smaller particles, and the like.

Figure 3:
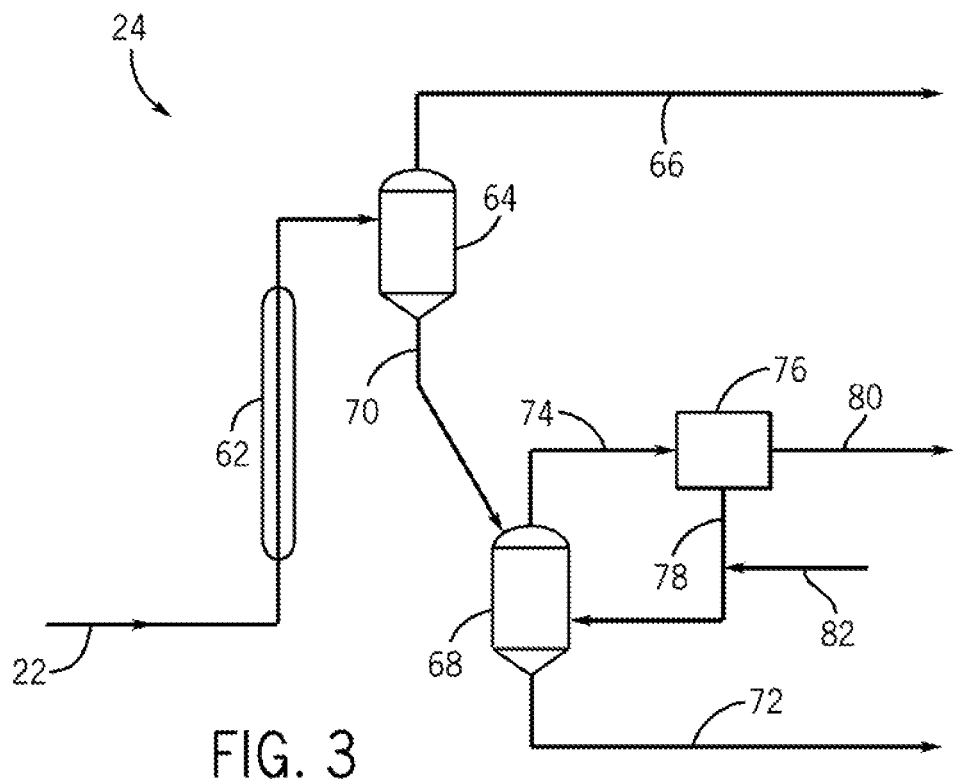
FIG. 3 is a process flow diagram of an exemplary monomer/diluent recovery system of the polyethylene production system of FIG. 1 in accordance with embodiments of the present techniques.

FIG. 3 is an exemplary diluent/monomer recovery system 24. The polyethylene fluff slurry 22 discharging from the reactor 50B flows through a flash line having an in-line flash heater 62, and into a separations vessel 64. The separations vessel 64 may be a flash vessel, a flash chamber, a simple settling drum, a high efficiency cyclone, or combination of cyclone and flash chamber, or other suitable device to separate the solids from the majority of the diluent.

The in-line flash heater 62 may be a surrounding conduit or jacket that uses steam or steam condensate, for example, as a heating medium to provide indirect heating to the slurry 22. Thus, the second loop slurry reactor 50B effluent (product fluff slurry 22) is heated prior to its introduction into the flash chamber 64. Further, the slurry 22 may generally experience a pressure reduction through the flash line and therefore vaporization of non-solid components due to both pressure decrease and temperature increase. Also, before the product fluff slurry 22 enters the flash chamber 64, water or other catalysts poisons may be injected into the slurry 22 to deactivate any residual catalysts and cocatalysts in the slurry 22. Because these injected components are generally catalysts poisons, they are typically completely removed, or at least substantially removed, from any recovered material (e.g., monomer or diluent) recycled to the reactors 50A, 50B.

In the flash chamber 64 (e.g., or more generally a separation vessel), most of the non-solid components of the reactor discharge slurry 22 are withdrawn overhead as vapor in the flash gas 66. Note, recycled flash gas 66 that may be condensed and bypass 34 the fractionation system 30 in route to a reactor 50A, 50B (i.e., via the feed system 16), for example (see also FIG. 1). On the other hand, all or a portion of flash gas 66 (as vapor and/or liquid) may be sent to the fractionation system 30 (see also FIG. 1). In polyethylene production, this vapor is typically primarily diluent, such as isobutane or other diluents previously mentioned. It may also contain most of the unreacted monomer (e.g., ethylene) and other light components, as well as unreacted comonomer (e.g., 1-hexene, butene, 1-pentene, 1-octene, and 1-decene) and other heavy components (e.g., hexane and oligomers). An exemplary approximate composition of the flash gas 66 is 94 wt. % isobutane, 5 wt. % ethylene, and 1 wt. % other components. A level or volume of fluff may be maintained in the flash chamber 64 to give additional residence time of the fluff in the chamber 64 to facilitate separation of liquid and vapor entrained in the porous fluff particles.

The flash gas 66 may be processed in equipment such as cyclones, bag filters, etc., where entrained fluff solids are removed and returned to the flash chamber 64 or to downstream equipment, such as the purge column discussed below. The flash gas 66 may also travel through a de-oxygenation bed, for example. Furthermore, the flash gas 66 may be cooled or condensed in a heat exchanger (e.g., shell-and-tube construction) prior to its recycle to the feed system 16 or fractionation system 30 (see also FIG. 1). Beneficially, in part because of the operating pressure of the flash chamber 64 in certain embodiments, such cooling, condensation, and direct recycle of the flash gas 66 may be performed without compression in some examples. The flash gas 66 may correspond to part or all of recycle streams 26 and 34 of FIG. 1 in certain examples.

As for the solids (polymer) in the flash chamber 64, they are withdrawn with a small amount of entrained diluent (and monomer) and sent to a purge column 68 via solids discharge 70. As will be appreciated by those of ordinary skill in the art, the solids discharge 70 conduit may include valve configurations that allow polymer to flow downward through the conduit while reducing the potential for vapor to flow between the purge column 68 and the flash chamber 64. For example, one or more rotary or cycling valves, a single v-ball control valve, fluff surge tanks, relatively small fluff chamber, and so on, may be disposed on the solids discharge 70 conduit. Moreover, a level of solids may be maintained in the flash chamber 64 via a level control valve at the base of the flash chamber 64 or on the solids discharge conduit 70, providing for increased residence time of the solids in the flash chamber 64. In more traditional configurations, the fluff solids from the flash chamber 64 may discharged into a lower pressure flash chamber, with the lower pressure flash gas requiring compression for recycle to fractionation system 30 and reactor. However, newer technologies have provided for elimination of a low pressure flash and the associated gas compression, and instead discharge of the fluff solids from the flash chamber 70 to the purge column 68.

In the illustrated embodiment, the primary solids feed to the downstream purge column 68 is typically the solids discharge 70 (polyethylene fluff) that exits the flash chamber 64. A purpose of the purge column 68 is to remove residual hydrocarbon from the entering solids streams and to provide substantially-clean polymer fluff 72 with at most relatively small amounts of entrained volatile organic content (VOC). The fluff 72 may be transported or conveyed to the extrusion system 36 (FIG. 1) for conversion to pellets 38, and for distribution and sale as polyolefin pellet resin to customers 40 (see FIG. 1) via loadout system 39. In general, the treated polymer particles discharged from purge column 68 as polymer fluff 72 may be processed in a conventional finishing operation, such as a twin screw extruder, in the extrusion/loadout system 36 (FIG. 1).

In the exemplary purge column 68 system illustrated, nitrogen is injected into a purge column 68 to remove residual hydrocarbons via overhead discharge 74. This discharge 74 may be sent through a separation unit 76, such as a membrane recovery unit, pressure swing adsorption unit, refrigeration unit, and so forth, to recover nitrogen via nitrogen stream 78, and to discharge a separated hydrocarbon stream 80 which may be compressed and fed to the fractionation system 30, for example. This separated hydrocarbon stream 80 may correspond to a portion of stream 26 of FIG. 1 in certain examples. In the art, the separation unit 76 may be known as a Diluent Nitrogen recovery Units (DNRU). Isobutane Nitrogen Recovery Unit (INRU), and the like. Moreover, fresh nitrogen 82 may be added to the nitrogen circuit to account for nitrogen losses in the purge column 68 system. Finally, it should be noted that the hydrocarbon stream 80 discharging from the separation unit 76 may be compressed and processed in the fractionation system 30 (FIG. 1) to give olefin-free diluent used in catalyst preparation and reactor or line flushes.

Lastly, as will be appreciated by those of ordinary skill in the art, a variety of configurations may be employed in the diluent/monomer recovery system 24. For example, the solids discharge 70 from the flash chamber 64 may be sent to another reactor (e.g., a liquid phase reactor or gas phase reactor) or to a low-pressure flash chamber instead of to the purge column 68. The polymer may then later enter the purge column 68 (i.e., from the additional reactor or low-pressure flash chamber). If discharged to another reactor from the flash chamber 64, catalyst poison is generally not injected upstream in the discharge 22, and, thus, residual active catalysts remain for further polymerization. In another configuration, the purge column 68 may be eliminated from the recovery system 20 and combined with the downstream extruder feed tank, and residual hydrocarbon or volatile organic (VOC) removal performed in such a combination. Indeed, the separation unit 76 associated with the purge column 68 may be relocated to accommodate the purge column/extruder feed tank combination, for example. Of course a variety of other configurations and types of vessels and equipment are contemplated in the present techniques.

IV. Polymerization Reactor Feed System

Figure 4:
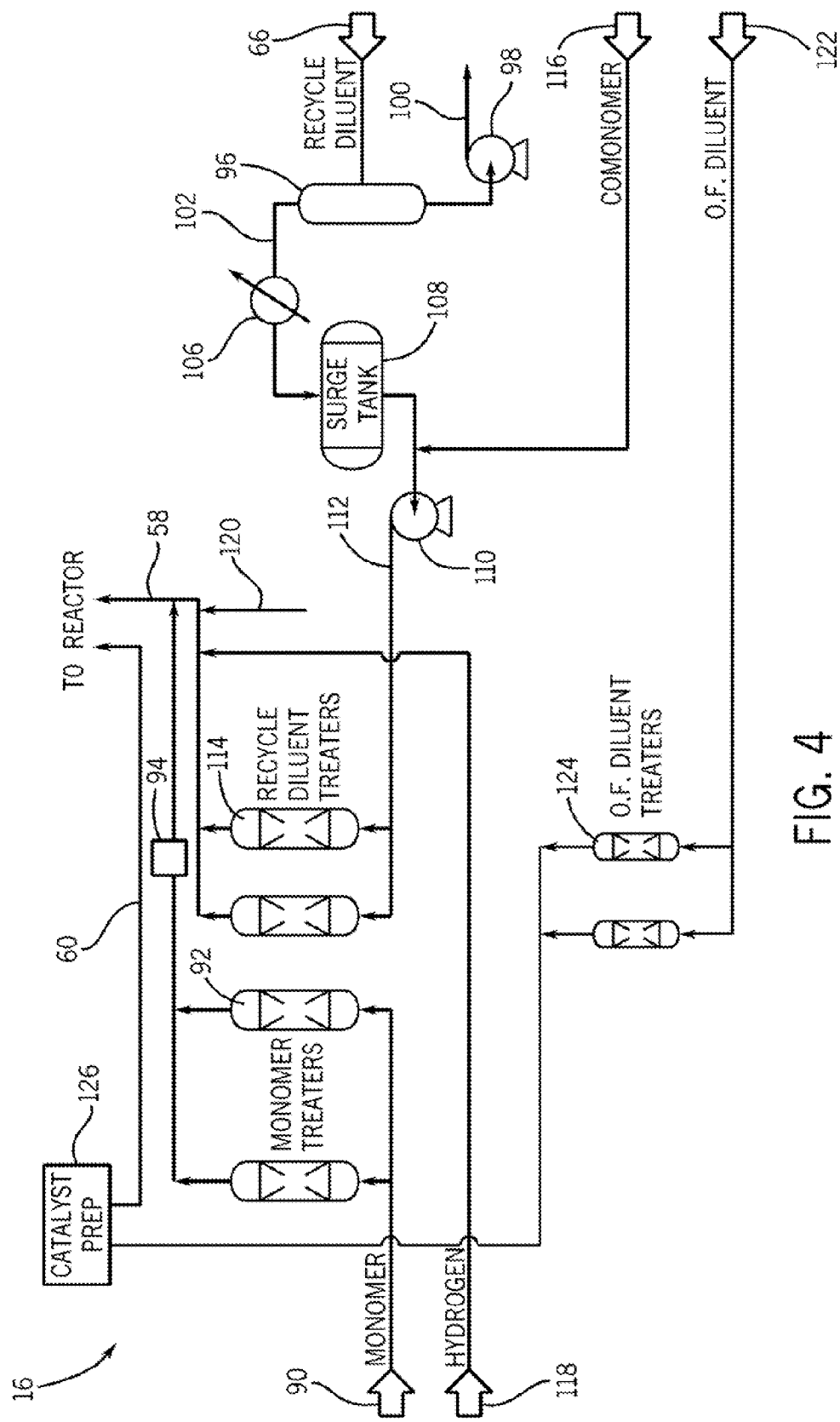
FIG. 4 is a process flow diagram of an exemplary reactor feed system of the polyethylene production system of FIG. 1 in accordance with embodiments of the present techniques.

Referring to FIG. 4 and as discussed below, a variety of feeds to the polymerization reactors may be adjusted to adjust catalyst residence time in the polymerization reactors, and thus to adjust particles size of the polyethylene fluff in the polymerization reactors. FIG. 4 depicts an exemplary reactor feed system 16 (of FIG. 1) for the polymerization reactors. In this embodiment, monomer 90 (e.g., ethylene) is fed through monomer treaters 92 to the liquid phase reactor (e.g., loop slurry reactor 50A, 50B) in the reactor system 20. Furthermore, a flow meter 94 (e.g., mass flow meter, Coriolis mass meter, orifice plate meter, differential pressure meter, etc.) may be used to measure the flow rate of ethylene to the polymerization reactor 50A, 50B. Indeed, the flow rate of ethylene monomer 90 to the reactor generally is typically measured (and controlled) to facilitate desired operating conditions (e.g., slurry density, comonomer/monomer ratio, production rate, etc.) in the polymerization reactor and to provide the desired properties of the polyethylene formed in the reactor.

Flash gas 66 (see also FIG. 3) having primarily recycle diluent (e.g., isobutane) or with a relatively small amount of entrained ethylene may be returned from the diluent/monomer recovery system 24 (e.g., corresponding to stream 34 of FIG. 1) and sent to the polymerization reactor 50A. 50B in reactor system 20. In the example of "direct" recycle to the reactor, the recycled diluent or flash gas 66 may be cooled and passed through a heavies knockout pot 96, where heavy components are removed out of a bottom discharge and sent via a centrifugal pump 98, for example, as feed 100 to the fractionation system 30. The overhead 102 of the knockout pot 96 may be further cooled in a heat exchanger 106 and collected in a recycle diluent surge tank 108 for feed to the reactor. Downstream, a centrifugal pump 110 may deliver the diluent 112 through recycle diluent treaters 114 to the loop slurry reactor. It should be noted that a relatively small amount of fresh diluent (not illustrated) may be added in the fractionation system 30, for example, to make-up for diluent losses in the polyethylene manufacturing system 10. Furthermore, comonomer 116 (e.g., 1-hexene) may be added to the suction of pump 110 or at other points in the recycle diluent circuit for addition to the reactor. The monomer treaters 92 and recycle diluent treaters 114 may include molecular sieve or aluminum packing, for example, configured to remove catalyst poisons from the monomer, recycle diluent, comonomer feeds, and other feeds.

Other feed components may be added to the loop slurry reactor. For example, hydrogen 118 may be added to control the molecular weight of the polyolefin formed in the reactor. Furthermore, other additives, such as antistatic materials, catalyst activity inhibitors, and so on, may be injected into the reactor, as indicated by reference numeral 120. The various component streams may combine into a feed stream 58A, 58B or 60 (see also FIG. 2) for feed to the loop slurry reactor. Further, as discussed below, diluent 122 that is substantially olefin-free may be recycled from the fractionation system 30 through treaters 124 for use in the preparation of the catalyst fed to the reactor. Indeed, the diluent 122 may act as a carrier of the catalyst stream 60 discharged from the catalyst preparation system 126 in route to the loop slurry reactor. Lastly, treaters may be employed to process the various feeds, such as to remove catalyst poisons from the comonomer, fresh isobutane, and hydrogen.

V. Particle Size

Figure 5:
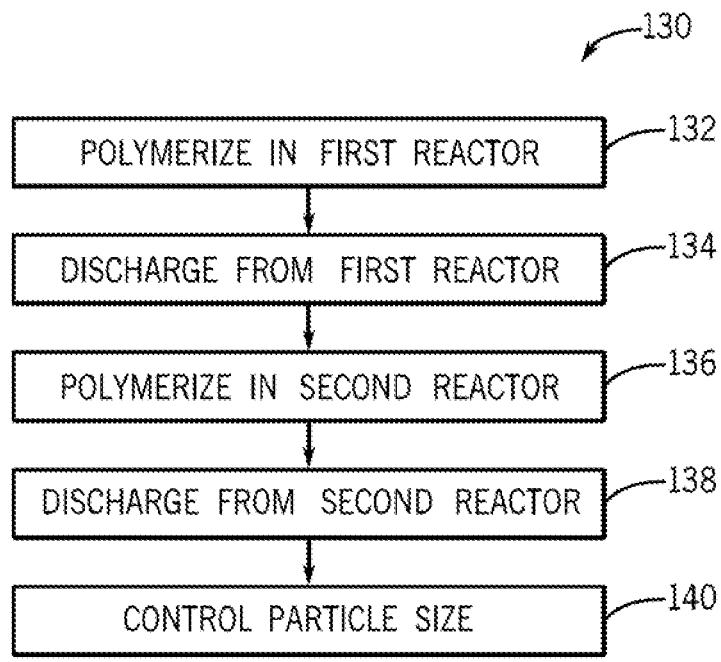
FIG. 5 is a block flow diagram of a method of operating a reactor system in polyolefin production system in accordance with embodiments of the present techniques.

FIG. 5 is a method 130 of operating or controlling a polyethylene production system 10 (FIG. 1) having a reactor system 20 (FIG. 2). The method 130 beneficially controls particle size of polyethylene formed in the polymerization reactor system 20, and thus to enhance operability, for instance, of the production system 10. In certain embodiments, the reactor system 20 has two polymerizations reactors (e.g., liquid-phase reactors, loop reactors, etc.) disposed and operated in series. Thus, as discussed, a first polymerization reactor may discharge to a second polymerization reactor. As also discussed above, various feed components such as catalyst, diluent, ethylene, comonomer (e.g., 1-hexene), hydrogen, and so on may be fed to the reactor system 20.

Initially, as indicated in FIG. 5, ethylene is polymerized (block 132) on a catalyst in a first polymerization reactor to form intermediate polyethylene particles having the catalyst and a first polyethylene. In certain examples, as the ethylene polymerizes in the first reactor to give the first polyethylene, the first polyethylene grows on the catalyst particle to form the intermediate polyethylene particles. The intermediate particles discharge (block 134) from the first polymerization reactor in a transfer slurry through a transfer line to the second polymerization reactor. The transfer slurry may include the intermediate polyethylene particles (having active catalyst), diluent, and unreacted components such as ethylene, comonomer (e.g., 1-hexene), and so on.

Ethylene is polymerized (block 136) on the catalyst in the intermediate polyethylene particles in the second polymerization reactor to form a second polyethylene and to form product polyethylene particles having the catalyst, the first polyethylene, and the second polyethylene. In certain examples, as the ethylene polymerizes in the second reactor to give the second polyethylene, the second polyethylene grows on the catalyst particle in the intermediate polyethylene particles to form the product polyethylene particles. The product polyethylene particles discharge (block 138) from the second polymerization reactor (i.e., in a discharge slurry) for further processing such as in a diluent/monomer recovery system 24 (FIG. 1 and FIG. 3), and so on.

The method 130 may include controlling (block 140) particle size of the product polyethylene particles that discharge from the second polymerization reactor. The particle size of the product particles may be controlled by adjusting a residence time of the catalyst through the first polymerization reactor and/or the second polymerization reactor. An increased residence time may provide for larger particles (e.g., a larger mean or median particle size) of the product polyethylene particles. Conversely, a decreased residence time may provide for smaller particles (e.g., a smaller mean or median particle size) of the product polyethylene particles.

The residence time of the catalyst may be increased by increasing the solids concentration of the circulating slurry in the first polymerization reactor and/or the second polymerization reactor. Solids concentration may be increased by decreasing diluent feed rate and/or increasing catalyst feed rate to the polymerization reactors, for example. Conversely, the residence time of the catalyst may be decreased by decreasing solids concentration of the circulating slurry in one or both of the polymerization reactors. The solids concentration may be decreased by increasing diluent feed rate and/or decreasing catalyst feed rate to the polymerization reactors, for example.

In certain embodiments, the total residence time of the catalyst through the reactors may generally be a sum of catalyst residence time in the first polymerization reactor plus the catalyst residence in the second polymerization reactor. Thus, adjusting the residence time (i.e., the total residence time) of the catalyst may involve adjusting the catalyst residence time in the first reactor and/or second reactor.

The catalyst residence time in the first polymerization reactor may be adjusted by adjusting a rate of a diluent feed stream to the first polymerization reactor, for example. The catalyst residence time in the second reactor of the catalyst may be adjusted by adjusting a rate of a first diluent feed stream to the first polymerization reactor and/or adjusting a rate of a second diluent feed stream to the second polymerization reactor. A change in diluent feed rate to the first polymerization reactor may impact the residence time in the second polymerization reactor because the increased presence of diluent in the first reactor is communicated via the transfer slurry to the second reactor. Lastly, along with adjusting diluent feed, the catalyst residence time in the first polymerization reactor and second polymerization may be adjusted by adjusting the related solids concentration in the first polymerization reactor and second polymerization reactor, respectively.

The particle size of the product particles may also be controlled by adjusting catalyst activity (e.g., having units of mass polymer produced per mass of catalyst used per time) in the first polymerization reactor and/or in the second polymerization reactor. A more active catalyst generally gives increased particle size of the product polyethylene particles discharging from the second reactor. Conversely, a less active catalyst generally gives decreased particle size of the product polyethylene particles.

An initial catalyst activity may be a property associated with the supplied catalyst. However, as discussed below, the catalyst activity may be adjusted via an addition of an activity modifier (inhibitor or promoter) to the process. Certain feed or reactor components, such as hydrogen added for molecular weight control, may act as a catalyst inhibitor decreasing catalyst activity, or may act as catalyst promoter increasing catalyst activity, depending on the catalyst system employed and the polyolefin produced, for example. Also, cocatalysts (e.g., aluminum alkyls) may be added to the catalyst feed or reactor to activate the catalyst, for example, and which typically increases catalyst activity. Further, according to the present techniques, an activity modifier that inhibits or lowers catalyst activity may be added to facilitate control of polyethylene particle size.

According to the present techniques, an activity modifier (inhibitor and/or promoter) may be added to the polymerization reactors to adjust the catalyst activity. Activity modifiers may include an activity retarder or activity inhibitor (e.g., a catalyst poison). Indeed, a desired decrease in catalyst activity (i.e., to reduce particle size of the product polyethylene particles) may be realized by adding an activity inhibitor to the first polymerization reactor and/or to the second polymerization reactor. Further, an increase in catalyst activity (i.e., to increase particle size of the product polyethylene particles) may be realized by stopping or decreasing the addition rate of the activity inhibitor.

Exemplary activity inhibitors include phenolics (butylated hydroxytoluene BHT, antioxidant BHEB, Irganox 1076, Irganox 1010), phosphites (trisnonylphenyl phosphite TNPP, Irgafox 168, Weston 626), thioesters (antioxidants DLTDP and DSTDP), amines (Tinuvin 622, Chimmassorb 944), reactor antistatic agents (Stadis 450), carbon dioxide, carbon monoxide, acetylene, and so on. In some embodiments, the activity inhibitors may be injected into a feed stream (e.g., feed 58) from a container (cylinder, drum, box, vessel, etc.) having the activity inhibitor.

Again, catalyst activity may be controlled at least in part by addition of an activity inhibitor or catalyst poison. In certain examples, if a Zeigler Natta catalyst is used in a dual loop process where a low molecular weight, high density polyethylene component is produced in the first reactor, the catalyst activity could be very high because of the first reactor conditions (e.g., high hydrogen, the temperature, the ethylene concentration, etc.). In some examples, this higher activity in the first reactor might beneficially be tempered to equalize the activity between the reactors to better control particle size of the polyethylene, and so on.

It should also be noted that polyethylene fluff particle size may generally be correlated with catalyst productivity, which is mass of polyethylene produced per mass of catalyst used. Catalyst productivity may be characterized as catalyst activity multiplied by the reactor residence time of the catalyst. Thus, the aforementioned techniques of adjusting residence time and catalyst activity may be application to adjusting catalyst productivity to control particle size. Moreover, as discussed below, the amount of fracturing of a polyethylene particle may be related to catalyst productivity, catalyst activity, and catalyst residence time, catalyst particle density, and so forth. Controlling or adjusting the particle size may include adjusting an amount of fracturing of the polyethylene particles in the reactor system.

Further, to adjust activity (and thus the productivity) of the catalyst to control particle size of the polyethylene fluff, the temperature in the first and/or second polymerization reactors may be adjusted. The activity and productivity of the catalyst in the first reactor 50A may be adjusted by altering the temperature (i.e., of the circulating slurry) in the first reactor 50A. Likewise, the activity and productivity of the catalyst in the second reactor 50B may be adjusted by altering the temperature (i.e., of the circulating slurry) in the second reactor 50B. Typically, a direct proportional relationship exists between catalyst activity/productivity versus reactor temperature. In other words, in general, an increasing reactor temperature provides for increasing catalyst activity and productivity, and a decreasing reactor temperature provides for decreasing catalyst activity and productivity. However, such a relationship between catalyst activity and productivity versus reactor temperature depends on the operating conditions in relation to the resulting point or region of the polymerization (reaction) kinetics. Indeed, depending on the point on the kinetics curve, for example, adjusting temperature may provide for a significant change (direct relationship) in activity and productivity, or substantially no change in activity and productivity.

Lastly, controlling the particle size of the product polyethylene particles may further include selecting an alternative catalyst and feeding the alternative catalyst to the reactor system (e.g., to the first polymerization reactor). The alternate catalyst may be the same or different type of catalyst as currently being employed but with a different particle size of the catalyst. Indeed, the particle size of the produced polyethylene fluff may be related to the particle size of the fed catalyst. As indicated, particle size may be characterized as a mean particle size, a median particle size, a particle size distribution, and so forth.

As discussed above, the slurry discharge of the reactor typically includes the polymer fluff as well as non-polymer components, such as unreacted olefin monomer (and comonomer), diluent, and so forth. In the case of polyethylene production, the non-polymer components typically comprise primarily diluent, such as isobutane, having a small amount of unreacted ethylene (e.g., 5 wt. %). This discharge stream is generally processed, such as by a diluent/monomer recovery system (e.g. flash vessel or separator vessel, purge column, etc.) to separate the non-polymer components from the polymer fluff. The recovered diluent, unreacted monomer, and other non-polymer components from the recovery system may be treated, such as by treatment beds and/or a fractionation system, and ultimately returned as purified or treated feed to the reactor. Some of the components may be flared or returned to the supplier, such as to an olefin manufacturing plant or petroleum refinery. As for the recovered polymer (solids), the polymer may be treated to deactivate residual catalyst, remove entrained or dissolved hydrocarbons, dry the polymer, and pelletize the polymer in an extruder, and so forth, before the polymer is sent to customer.

A particular issue in polyethylene production is the undesirable carryover of volatile organics (e.g., diluent, monomer, comonomer, and other hydrocarbons) with and in the polymer fluff particles exiting the "wet end" of the polyolefin manufacturing process (e.g., exiting a purge column in the monomer/diluent recovery system). This stream of fluff particles exiting the wet end is generally transferred to the "dry end" (e.g., through a pneumatic conveying system) where the fluff may be stored in silos, extruded into pellets, and then loaded as pellets into containers or railcars, and the like. The hydrocarbon in the stream of polymer fluff exiting the wet end (e.g., exiting a purge column) may be entrained with the polymer fluff, dissolved in the polymer fluff, absorbed and/or adsorbed on the polymer fluff, contained within pores of the polymer fluff, and so on. The hydrocarbon may be undesirably released to the atmosphere at various points in the dry end process (e.g., in the extrusion and product loadout systems), resulting in the loss of hydrocarbon, exceeding of environmental permitting allowances, and so on.

Further, it should be noted that the amount of VOC in the polymer fluff may be affected by the amount and condition of purge gas if employed in the degassing operation, and the upstream reactor conditions such as type and amount of comonomer, and so forth. Heavier comonomer (e.g., 1-hexene) added to the upstream reactors, for instance, may contribute to a higher VOC in downstream fluff.

In certain embodiments, the particle size of the polyethylene fluff in the polymerization reactors may be controlled or adjusted to beneficially increase separation or separation efficiency of removing hydrocarbon from the polyethylene fluff in downstream processing equipment (e.g., flash vessels, drums, purge column 228, etc.). For a discussion of removal of residual hydrocarbon from the polyethylene fluff, and the related volatile organic content (VOC) of the polyethylene fluff, see U.S. Pat. No. 7,957,947 which is incorporated by reference herein in its entirety. It should be emphasized that the present techniques accommodate increasing separation efficiency in a variety of downstream vessels or separators (other than the disclosed purge column 68) by adjusting particle size of the polyethylene fluff particles in the upstream polymerization reactors.

For the case of a purge column as discussed, an exemplary purge column 228 may be cylindrical vessel having a relatively tall vertical section, a cover or head at the top, sloped sides or conical shape at the bottom with an opening for polymer fluff discharge. The polymer (e.g., polyethylene) fluff to be degassed of volatile hydrocarbons may enter the vessel at the top, while the purge gas, typically nitrogen, may be introduced to the vessel in the slopped bottom sides. Flow may be countercurrent between the purge gas and polymer fluff in the vessel. Again, in certain embodiments, the hydrocarbon rich purge gas leaves the vessel through an opening at the top, while the degassed fluff leaves at the bottom of the vessel.

Degassing effectiveness in this purge vessel and other purge vessels may be predicated on the maintenance of uniform plug flow of the polymer fluff and purge gas in the vessel, thereby facilitating good contact between the two. In some examples, the diameter of the vessel typical range from 5 to 6 feet, but its length (L/D ratio) is chosen to achieve a residence time (e.g., 30 to 180 minutes) sufficient for degassing the polymer fluff. Example L/D ratios may range from 4 to 8, or outside this range. It should also be noted that internals may be employed in the purge column, such as a distributor plate for introducing purge gas (nitrogen), an inverted cone for facilitating plug glow of the polymer (e.g., reduce bridging or channeling of the polymer fluff), and so on.

Figure 6:
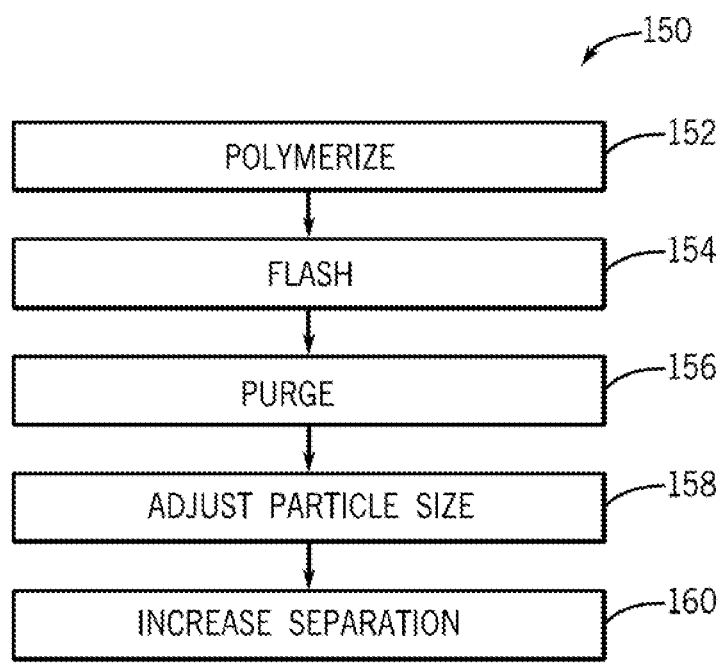
FIG. 6 is a block flow diagram of a method of operating a polyolefin production system including increasing VOC separation efficiency in accordance with embodiments of the present techniques.

FIG. 6 is a method 150 directed to increasing separation of hydrocarbon (i.e., VOC removal) from the polyethylene fluff particles in downstream separation equipment. In particular, FIG. 6 is a method of operating a polyethylene production system 10 where polyethylene fluff particle size is adjusted in the polymerization reactors to increase separation or removal of hydrocarbon, residual hydrocarbon, VOC, etc., removal from the polyethylene fluff particles in downstream equipment, such as a low pressure flash vessel, purge column 68, and so on. In certain embodiments, a reactor system 20 with dual loop reactors 50A, 50B is considered.

Initially, as represented by block 152, ethylene (and an optional comonomer such as 1-hexene) are polymerized in the first loop reactor to produce a first polyethylene, and polymerized in a second reactor to produce a second polyethylene. In the case of monomodal or non-differentiated production, the first polyethylene may resemble or somewhat different than the second polyethylene. On the other hand, in the case of bimodal or differentiated production, the first polyethylene is different in at least some properties than the second polyethylene. With the two reactors operating in series, a transfer slurry 21 is discharged from the first loop reactor 50A through a transfer line 21L to the second loop reactor 50B. Further, a product slurry 22 is discharged from the second loop reactor 50B, such as continuously discharged through a CTO, for example.

The product slurry 22 may sent through a flash line and a first separator vessel (e.g., flash vessel) to flash (block 154) hydrocarbon (e.g., diluent, unreacted ethylene, etc.) from the polyethylene fluff in the product slurry 22. The polyethylene fluff discharging from the first separator vessel may be purged (block 156) in a second separator vessel (e.g., purge column) to remove residual hydrocarbon from the polyethylene fluff. According to the present techniques, the particle size of the polyethylene fluff may be adjusted (block 158) in the upstream polymerization reactors to increase (block 160) separation efficiency in the second separator vessel (e.g., purge column 68).

FIG. 7 is an example result (plot) of a sensitivity study with an exemplary model to evaluate the impact of purge parameters (e.g., polyethylene particle size) on the VOC of polyolefin polymer (i.e., fluff) stream leaving the purge column. The exemplary model is based on mass-transfer theory, and is discussed in detail in the aforementioned U.S. Pat. No. 7,957, 947. The VOC of the polymer stream decreased for smaller polymer particle size. It is believed that the smaller particles generally enhance the diffusion of absorbed or adsorbed hydrocarbon components from the polymer.

In particular, FIG. 7 is a plot 170 of exemplary model results of VOC 172 ppm (part per million) in the polyolefin fluff stream discharged from the purge column versus average particle size 174 in $10^{-6}$ meters (microns or μ) in the polyolefin polymer fluff. A relationship exists between VOC 172 and polymer particle size 174, as illustrated by exemplary curve 176. In one sensitivity example of the model, with reducing fluff particle size from 800 microns to 600 microns (25% decrease), the VOC 172 was reduced by about 43% from 47 ppm to 26 ppm.

Figure 8A:
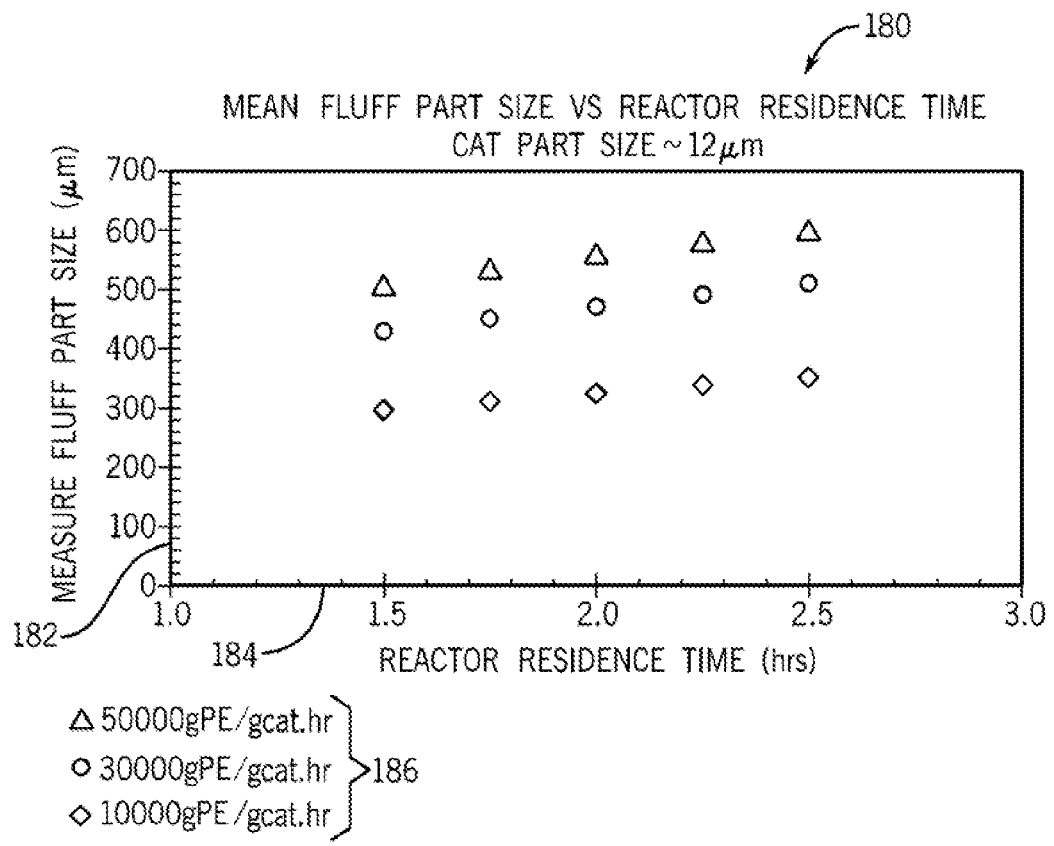
FIG. 8A is a plot of mean fluff particle size versus catalyst residence time at three different activities for the catalyst having a first particle size.
Figure 8B:
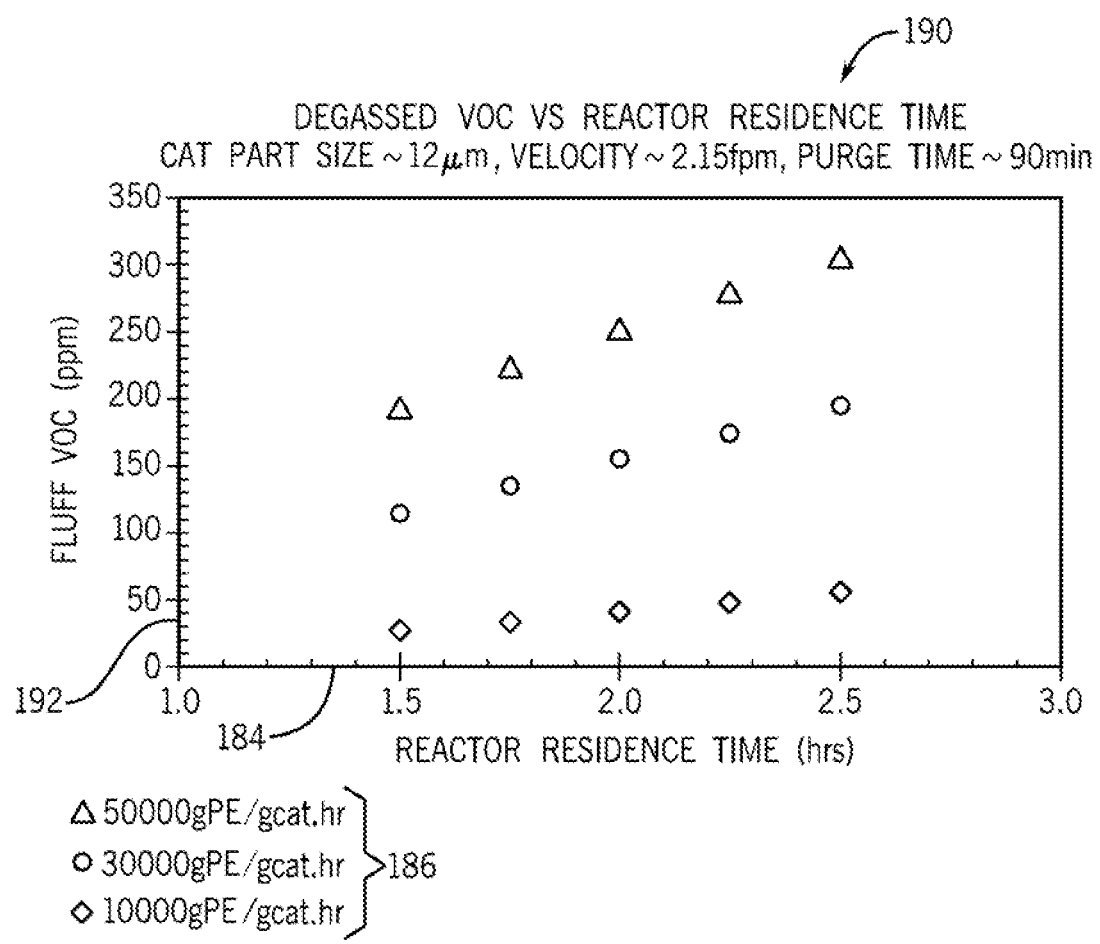
FIG. 8B is a plot of VOC of fluff leaving the purge column versus the catalyst residence time at three activities for the catalyst of FIG. 9A.
Figure 9A:
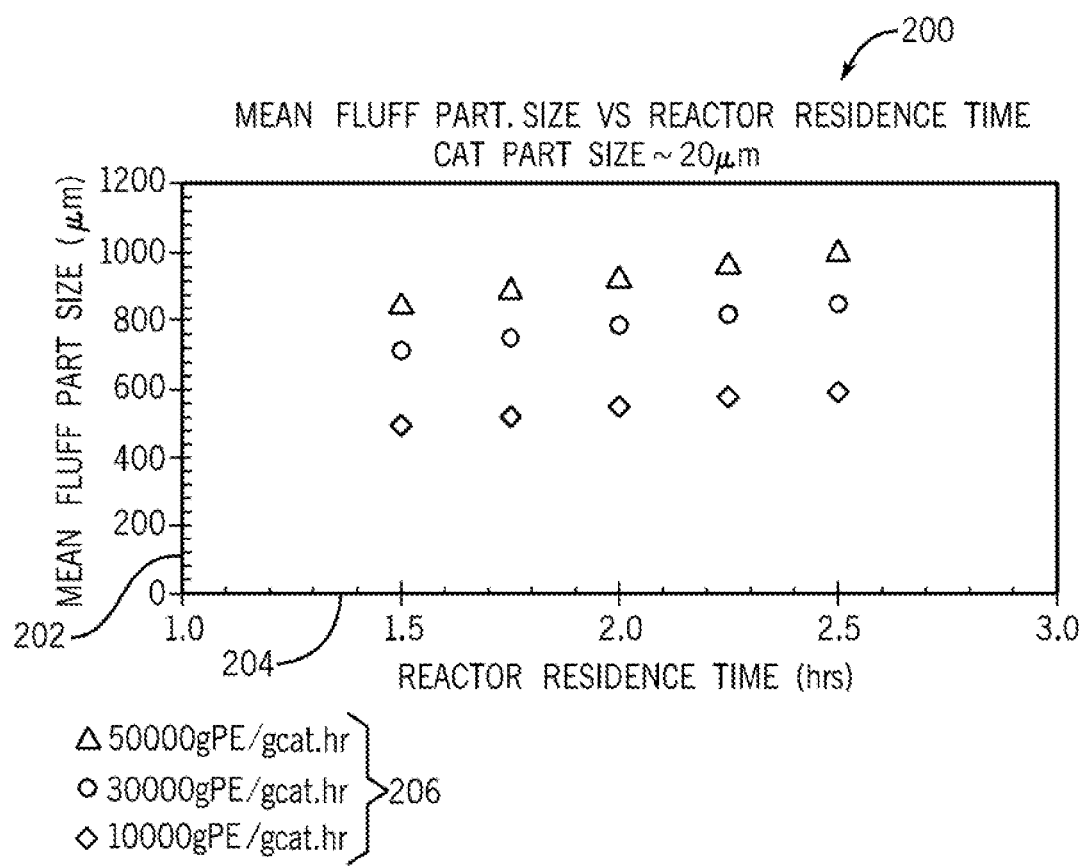
FIG. 9A is a plot of mean fluff particle size versus the 4 total residence time at three different activities for the catalyst of having a second particle size.
Figure 9B:
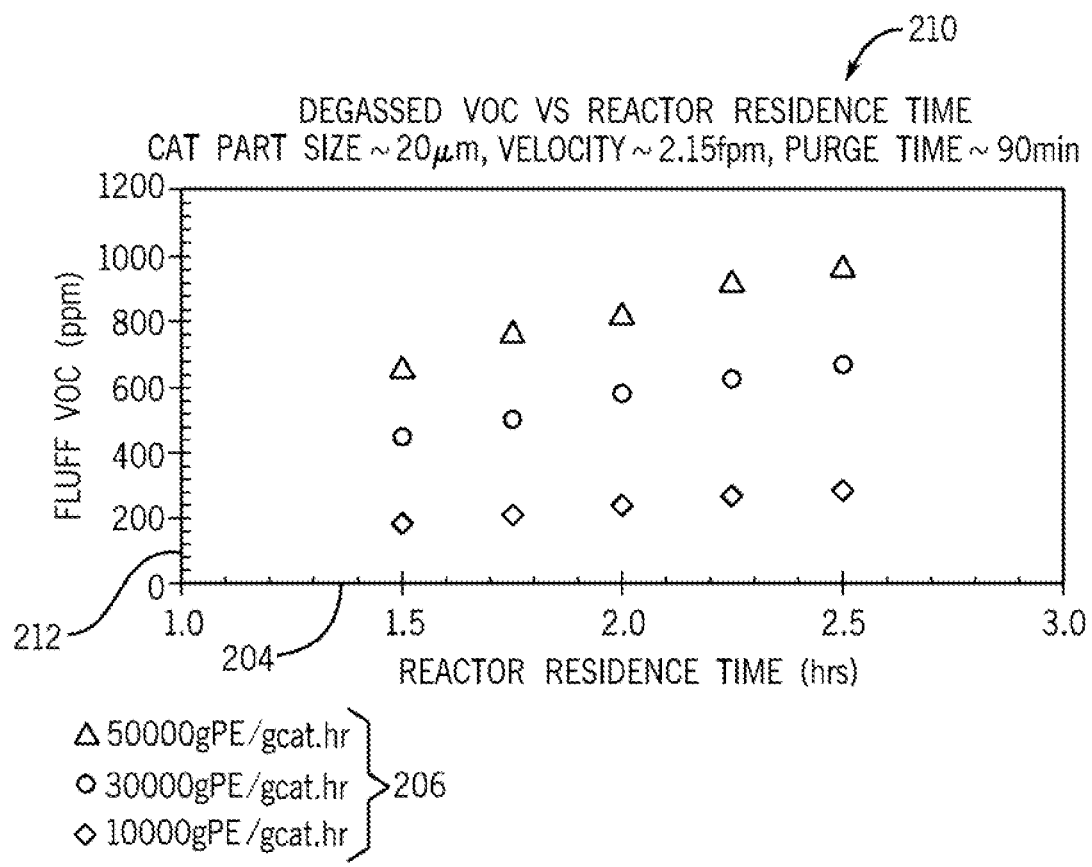
FIG. 9B is a plot of VOC of fluff leaving the purge column versus the catalyst residence time at three activities for the catalyst of the catalyst of FIG. 9A.

FIGS. 8A-9B present calculation results with related commercial data for polyethylene production regarding polyethylene fluff particle size and VOC, assuming no fracturing. For clarity, no fracturing of the polyethylene fluff particles is assumed. FIGS. 8A and 8B give data for polymerization of the polyethylene with catalyst having a median (D-50) particle size of about 12 microns ($10^{-6}$ meter or μm), and the subsequent removal of VOC from the polyethylene. FIGS. 9A and 9B give data for polymerization of the polyethylene with catalyst having a median (D-50) particle size of about 20 microns, and the subsequent removal of VOC from the polyethylene. The data show as that a larger catalyst particle gives larger polyethylene fluff particle size at similar catalyst residence time and catalyst activity. Further, assumptions of this replicated relationship include: (1) no fracturing of polyethylene fluff particles; and/or (2) a similar particle density of the two catalysts having the different diameters.

The particle density of the catalyst may also affect the resulting particle size of the fluff. In general, a catalyst having greater particle density (a more compact catalyst particle) may give a larger mean or median particle size of the fluff due to less fracturing in the reactors. Thus, in certain examples, a smaller catalyst particle having a greater particle density can give a larger fluff particle size than would a larger catalyst particle having a lower particle density. In accordance with the present techniques, fluff particle size may be adjusted by selecting a catalyst with a certain catalyst particle density, i.e., to modulate an amount of fracturing as discussed below.

The data indicated by FIGS. 8A-9B also show improved separation in the purge column 68 (FIG. 3) for larger particle size of the polyethylene fluff. In a sense, the improved or increased separation (increased removal of residual hydrocarbon or VOC from the fluff) may be characterized as an improved or increased efficiency of separation (e.g., in the purge column) because given the same mass of fluff, less residual hydrocarbon remains in the fluff (i.e., with smaller particle size).

FIG. 8A is a plot 180 of the mean fluff particle size 182 diameter (μm) versus the catalyst total residence time 184 (hours) in the upstream polymerization reactors at various catalyst activities 186. As indicated, the average catalyst particle size is about 12 microns. Three catalyst activities 186 in units of grams/hr of polyethylene (PE) fluff per gram of catalyst are given at 10,000, 30,000, and 50,000, respectively. The fluff particle size 182 is of the fluff discharging from the second or final reactor and that might ultimately enter the purge column 68 (FIG. 3). The relationships in FIG. 8A show that fluff particle size may be controlled by adjusting reactor residence time and by adjusting catalyst activity.

FIG. 8B is a plot 190 of the fluff VOC 192 (ppm) of the fluff leaving the purge column versus the catalyst total residence time 184 in the upstream polymerization reactors at the three catalyst activities 186. Again, the three activities 186 for the catalyst are 10,000, 30,000, and 50,000 in units of PE (grams/hr) polymerized and produced per catalyst (gram) used. Also as with the data of FIG. 8A, the average catalyst particle size is about 12 microns in the results presented in FIG. 9. In all, the relationships in FIGS. 8A and 8B show that separation efficiency, i.e., increased removal of residual hydrocarbon or VOC from the PE fluff, may be increased in the purge column by adjusting PE particle size, catalyst reactor residence time, and catalyst activity.

FIG. 9A is a plot 200 of mean fluff particle size 202 diameter (μm) versus the catalyst total residence time 204 (hours) in the upstream polymerization reactors at three catalyst activities 206, respectively, which are the same catalyst activities 186 of the data presented in previous FIGS. 8A and 8B. However, in contrast to the data presented in FIGS. 8A and 8B, the data associated with FIG. 9A is for an average catalyst particle size of about 20 microns. The relationships in FIG. 9A indicate that fluff PE particle size may be controlled by adjusting reactor residence time of the catalyst and by adjusting catalyst activity.

FIG. 9B is a plot 210 of the fluff VOC 212 (ppm) of the PE fluff leaving the purge column versus the catalyst total residence time 204 in the upstream polymerization reactors at the three catalyst activities 206, respectively. The relationships in FIGS. 9A and 9B indicate that separation efficiency, i.e., increased removal of residual hydrocarbon or VOC from the PE fluff, may be increased in the purge column by adjusting PE fluff particle size, reactor catalyst residence time, and catalyst activity.

As mentioned, the change from a smaller catalyst particle having a diameter of 12 microns (FIGS. 8A and 8B) to a larger catalyst particle having a diameter of 20 microns (FIGS. 9A and 9B) results in a larger particle size of the polyethylene fluff, such as with the polyethylene fluff in the product slurry 22 discharging from the second loop reactor, or with the polyethylene fluff in the solids discharge 70 from the flash chamber 64 to the purge column 68, for example. Thus, as discussed, controlling the particle size of the product polyethylene particles discharging from the polymerization reactor may include selecting an initial or alternative catalyst for feed to the reactor system 20. The catalyst may be selected based, in part, on particle size of the catalyst diameter, and thus to give a desired mean or median particle size of the polyethylene product fluff.

Further, the density of the catalyst particle may also be taken into account in controlling or adjusting fluff particle size, as mentioned above. For instance, less fracturing of the catalyst and fluff may be realized with selection of catalyst having a greater catalyst particle density, and thus giving a larger mean or median particle size of the polyethylene fluff. On the other hand, more fracturing of the catalyst and fluff may be realized with the selection of a catalyst having a lower particle density, and thus giving a smaller mean or median particle size of the polyethylene fluff.

Fracturing is breakage of the polyethylene fluff particles in the reactor and affects the particle size and VOC of the polyethylene fluff. As indicated, the amount of fracturing may be related to the particle density of the catalyst. Moreover, as with the size of the fluff particles generally, the size of the fractured particles of the polyethylene fluff may be related to catalyst activity and to the residence time of the catalyst in the reactor, and thus also related to catalyst productivity. Tables 1 and 2 provide commercial data and calculation results for dual loop reactor production of polyethylene with the two loop reactors disposed in series. The data presented is at a range of catalyst activity and catalyst residence time (total residence time through the two reactors), and associated catalyst productivity. A resulting fluff D-50 median particle size of the total polyethylene fluff is listed. As appreciated by those skilled in the art, the D-50 particle size is the median particle size, i.e., defined at which 50% of the particles in the distribution are smaller than the D-50 diameter size, and 50% of the particles in the distribution are larger than D-50 diameter size.

Moreover, fracturing data is presented in Table 1 and Table 2. In these examples, fracturing is categorized for fractures into 2 particles, fractures into 4 particles, fractures into 8 particles, and fractures into 16 particles. In Table 1, a median particle size diameter is listed for the non-fractured portion and each of the fractured portions. Further, in this example, the assumed population is 0.5 for non-fractured particles, 0.267 for the 2-fracture, 0.133 for the 4-fracture, 0.067 for the 8-fracture, and 0.033 for the 16-fracture. As mentioned, the median particle size diameter may be the D-50 particles size of the given portion. As appreciated by the skilled artisan, the D-50 particle size is defined as the particle diameter at 50% of the given population range. Thus, the D-50 particle size is the median particle size.

As can be seen from Table 1 with the total fluff particles including the non-fractured particles and the fractured particles, the particle size of the polyethylene increases with residence time and with catalyst productivity. As appreciated by the skilled artisan, catalyst productivity is catalyst activity multiplied by catalyst residence time. In Table 2, a VOC value is listed for each of the fractured portions. As can be seen from Table 2, the VOC of the fluff discharging from the purge column beneficially decreases with decreasing fluff particle size, decreasing catalyst activity, decreasing reactor residence time, and decreasing catalyst productivity.

TABLE 1

Polyethylene Particle Fracturing in the Loop Reactor System

| Activity lbPE/lbcat/hr | Residence Time, hrs | Productivity lbPE/lbcat | Fluff Particles* not fractured | Fracture* 2 Particles | Fracture* 4 Particles | Fracture* 8 Particles | Fracture* 16 Particles |
|---|---|---|---|---|---|---|---|
| 10,000 | 1.50 | 15000 | 296 | 148 | 74 | 37 | 19 |
| 10,000 | 1.75 | 17500 | 312 | 156 | 78 | 39 | 19 |
| 10,000 | 2.00 | 20000 | 326 | 163 | 81 | 41 | 20 |
| 10,000 | 2.25 | 22500 | 339 | 170 | 85 | 42 | 21 |
| 10,000 | 2.50 | 25000 | 351 | 176 | 88 | 44 | 22 |
| 30,000 | 1.50 | 45000 | 427 | 214 | 107 | 53 | 27 |
| 30,000 | 1.75 | 52500 | 450 | 225 | 112 | 56 | 28 |
| 30,000 | 2.00 | 60000 | 470 | 235 | 118 | 59 | 29 |
| 30,000 | 2.25 | 67500 | 489 | 244 | 122 | 61 | 31 |
| 30,000 | 2.50 | 75000 | 506 | 253 | 127 | 63 | 32 |
| 50,000 | 1.50 | 75000 | 506 | 253 | 127 | 63 | 32 |
| 50,000 | 1.75 | 87500 | 533 | 267 | 133 | 67 | 33 |
| 50,000 | 2.00 | 100000 | 557 | 279 | 139 | 70 | 35 |
| 50,000 | 2.25 | 112500 | 580 | 290 | 145 | 72 | 36 |
| 50,000 | 2.50 | 125000 | 600 | 300 | 150 | 75 | 38 |
| 10,000 | 1.50 | 15000 | 494 | 247 | 123 | 62 | 31 |
| 10,000 | 1.75 | 17500 | 520 | 260 | 130 | 65 | 32 |
| 10,000 | 2.00 | 20000 | 543 | 272 | 136 | 68 | 34 |
| 10,000 | 2.25 | 22500 | 565 | 283 | 141 | 71 | 35 |
| 10,000 | 2.50 | 25000 | 585 | 293 | 146 | 73 | 37 |
| 30,000 | 1.50 | 45000 | 712 | 356 | 178 | 89 | 44 |
| 30,000 | 1.75 | 52500 | 749 | 375 | 187 | 94 | 47 |
| 30,000 | 2.00 | 60000 | 784 | 392 | 196 | 98 | 49 |
| 30,000 | 2.25 | 67500 | 815 | 407 | 204 | 102 | 51 |
| 30,000 | 2.50 | 75000 | 844 | 422 | 211 | 106 | 53 |
| 50,000 | 1.50 | 75000 | 844 | 422 | 211 | 106 | 53 |
| 50,000 | 1.75 | 87500 | 889 | 444 | 222 | 111 | 56 |
| 50,000 | 2.00 | 100000 | 929 | 464 | 232 | 116 | 58 |
| 50,000 | 2.25 | 112500 | 966 | 483 | 242 | 121 | 60 |
| 50,000 | 2.50 | 125000 | 1001 | 500 | 250 | 125 | 63 |

*Values given are median diameter in microns for that portion

TABLE 2

VOC of Polyethylene Fluff Discharged from Purge Column

| VOC non-fractured* ppm | VOC 2 Part* ppm | VOC 4 Part* ppm | VOC 8 Part* ppm | VOC 16 Part* ppm | Avg VOC ppm |
|---|---|---|---|---|---|
| 10000 gPE/gcat./hr | | | | | |
| 25.4064 | 0.6468 | 0.3140 | 0.3170 | 0.3170 | 12.9493 |
| 32.2584 | 0.7921 | 0.3139 | 0.3169 | 0.3170 | 16.4140 |
| 39.3882 | 0.9466 | 0.3142 | 0.3169 | 0.3170 | 20.0201 |
| 46.6900 | 1.1494 | 0.3148 | 0.3169 | 0.3170 | 23.7252 |
| 54.0498 | 1.4168 | 0.3158 | 0.3168 | 0.3170 | 27.4765 |

TABLE 2-continued

VOC of Polyethylene Fluff Discharged from Purge Column

| VOC non-fractured* ppm | VOC 2 Part* ppm | VOC 4 Part* ppm | VOC 8 Part* ppm | VOC 16 Part* ppm | Avg VOC ppm |
|---|---|---|---|---|---|
| 30000 gPE/gcat · hr | | | | | |
| 112.6436 | 4.3408 | 0.3046 | 0.3162 | 0.3170 | 57.5516 |
| 133.6712 | 5.8459 | 0.3538 | 0.3160 | 0.3170 | 68.4733 |
| 154.0129 | 7.5939 | 0.3718 | 0.3157 | 0.3158 | 79.1127 |
| 173.6605 | 9.4407 | 0.3924 | 0.3170 | 0.3170 | 89.4318 |
| 192.6302 | 11.4533 | 0.4175 | 0.3152 | 0.3170 | 99.4565 |
| 50000 gPE/gcat · hr | | | | | |
| 192.6302 | 11.4533 | 0.4175 | 0.3152 | 0.3170 | 99.4565 |
| 222.8157 | 15.0319 | 0.4692 | 0.3138 | 0.3170 | 115.5104 |
| 251.3430 | 18.8693 | 0.5290 | 0.3144 | 0.3170 | 130.8054 |
| 278.3665 | 22.8997 | 0.5987 | 0.3141 | 0.3170 | 145.4012 |
| 304.0271 | 27.1098 | 0.6792 | 0.3140 | 0.3170 | 159.3649 |
| 10000 gPE/gcat · hr | | | | | |
| 178.6433 | 9.9626 | 0.3945 | 0.3154 | 0.3170 | 92.0625 |
| 207.3809 | 13.1395 | 0.4101 | 0.3150 | 0.3170 | 107.2806 |
| 234.6284 | 16.5686 | 0.4916 | 0.3150 | 0.3170 | 121.8296 |
| 260.5095 | 20.1959 | 0.5497 | 0.3130 | 0.3170 | 135.7451 |
| 285.1445 | 23.9793 | 0.6187 | 0.3141 | 0.3170 | 149.0807 |
| 30000 gPE/gcat · hr | | | | | |
| 448.2843 | 57.1321 | 1.5285 | 0.3168 | 0.3168 | 239.6128 |
| 498.1291 | 70.0027 | 2.0395 | 0.3194 | 0.3167 | 268.0357 |
| 579.1022 | 82.8112 | 2.6367 | 0.3236 | 0.3166 | 312.0178 |
| 622.1107 | 95.5462 | 3.2773 | 0.3291 | 0.3164 | 337.0038 |
| 661.8310 | 108.0816 | 4.0417 | 0.3291 | 0.3163 | 360.3086 |
| 50000 gPE/gcat · hr | | | | | |
| 661.8310 | 108.0816 | 4.0417 | 0.3291 | 0.3163 | 360.3086 |
| 765.2598 | 128.5097 | 5.4511 | 0.3491 | 0.3150 | 417.6597 |
| 820.3976 | 148.3075 | 7.0960 | 0.3605 | 0.3158 | 450.7281 |
| 918.8769 | 167.4591 | 8.8477 | 0.3731 | 0.3155 | 505.3093 |
| 966.7119 | 185.9735 | 10.7303 | 0.3731 | 0.3143 | 534.4149 |

*VOC in ppm for the median diameter particle in that portion

Figure 10:
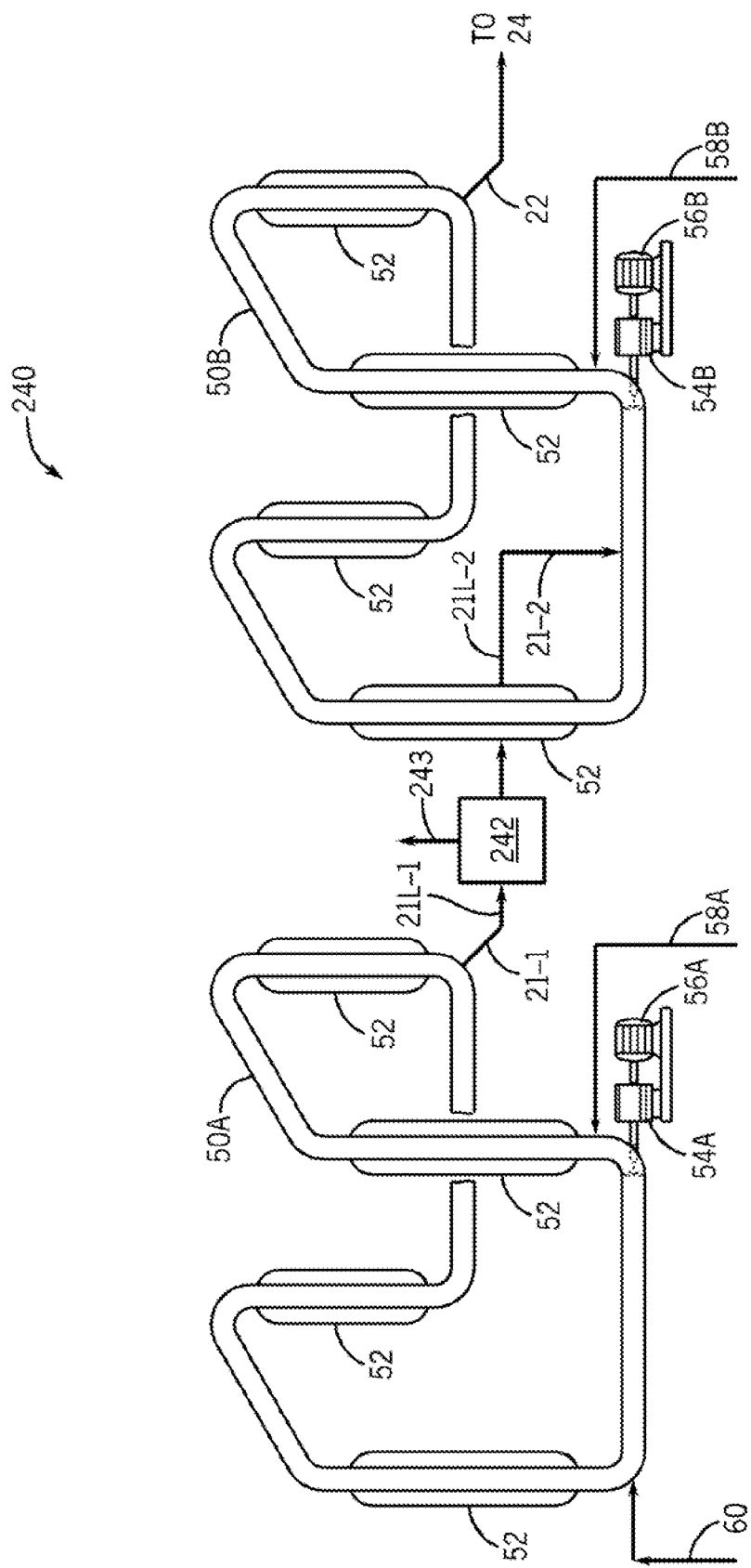
FIG. 10 is a process flow diagram of an exemplary alternate reactor system of a polyethylene production system in accordance with embodiments of the present techniques.

FIG. 10 depicts an alternate embodiment of a polyethylene polymerization reactor system 240 in which a fluff processing system 242 is disposed between a first loop reactor 50A and a second loop reactor 50B. The fluff slurry processing system 242 may involve removing light-ends 243 such as hydrogen and monomer (e.g., ethylene), and other components, from the transfer slurry 21-1 discharging from the first loop reactor 50A, for example. Other recovery streams and processing may be involved. Equipment may include flash vessels, distillation columns, pumps, heat exchangers, analytical equipment, control valves, and so on. Controlling particle size (e.g., adjusting toward larger particle size) of the polyethylene fluff discharging from the first reactor may beneficially improve operability (e.g., via lower slurry viscosity and improved hydraulics) in slurry flow and pump performance, for example, in the fluff processing system 242. Thus, control of transfer slurry flow, a transfer slurry pump, etc., within the fluff processing system 242 may be at least in part tied to fluff particle size, and stability of the operations improved. Moreover, controlling particle size (e.g., adjusting toward smaller particle size) may improve separation of hydrocarbons from the slurry or from the polyethylene fluff solids in the slurry processing system 242. Thus, control of a flash vessel or separation vessel, for example, in the slurry processing system 242 may be tied at least in part to fluff particle size, and the associated operation improved.

As with the reactor system 20 discussed above, the two loop slurry (polymerization) reactors 50A, 50B in reactor system 240 may be disposed and operated in series, and shifted to parallel operation if desired. Additional loop reactors or other reactors (e.g., gas phase reactors) may be included in the illustrated combination. As also discussed, a loop slurry reactor 50A, 50B is generally composed of segments of pipe connected by smooth bends or elbows. Reactor jackets 52 may be provided to remove heat from the exothermic polymerization via circulation of a cooling medium, such as treated water, through the reactor jackets 52.

The reactors 50A, 50B may be used to carry out polyolefin (e.g., polyethylene) polymerization under slurry conditions. A respective motive device, such as pump 54A, 54B, circulates the fluid slurry in each reactor 50A, 50B. The impeller may be driven by a motor 56A, 56B or other motive force. The various feed components represented by feed streams 58A, 58B discussed above may apply to reactor system 240. Further, at least one catalyst stream 60 is added to the reactor system 240.

A fluff product slurry 22 may discharge from the second loop reactor 50B and be subjected to further processing including ultimately extrusion into polyethylene pellets. The fluff product slurry 22 may discharge through a setting leg, CTO, isolation, valve, Ram valve, or other valving configuration. The fluff product slurry 22 may include a monomodal (or non-differentiated) polyethylene or a bimodal (or differentiated) polyethylene.

A first transfer line 21L-1 may route a first transfer slurry 21-1 from the first loop reactor 50A discharge to the fluff slurry processing system 242. This discharge from the first loop reactor and the associated transfer line 21L-1 may include a Ram valve, a CTO, a settling leg, or other valve arrangement. A second transfer line 21L-2 may route a second transfer slurry 21-2 from the fluff slurry processing system 242 to the second loop reactor 50B. In certain examples, a pump in the slurry processing system 242 may provide motive force for flow of the second transfer slurry 21-2 through the second transfer line 211-2.

The aforementioned techniques regarding controlling particle size of the polyethylene fluff are applicable to the illustrated embodiment of FIG. 10. For example, the particle size of the polyethylene fluff discharging from the first reactor 50A (in transfer slurry 21-1) and/or from the second reactor 50B (in product slurry 22) may be controlled or adjusted by adjusting reactor conditions. Such reactor conditions may include catalyst residence time, catalyst activity, catalyst productivity, and polyethylene fracturing, and so on. Activity modifiers including activity inhibitors may be added. Further, catalyst selection, such as with regard to catalyst particle size and/or catalyst density, may adjust particle size. Controlling particle size may beneficially improve operability in the reactors 50, the slurry processing system 242, and downstream unit operations and equipment.

Figure 11:
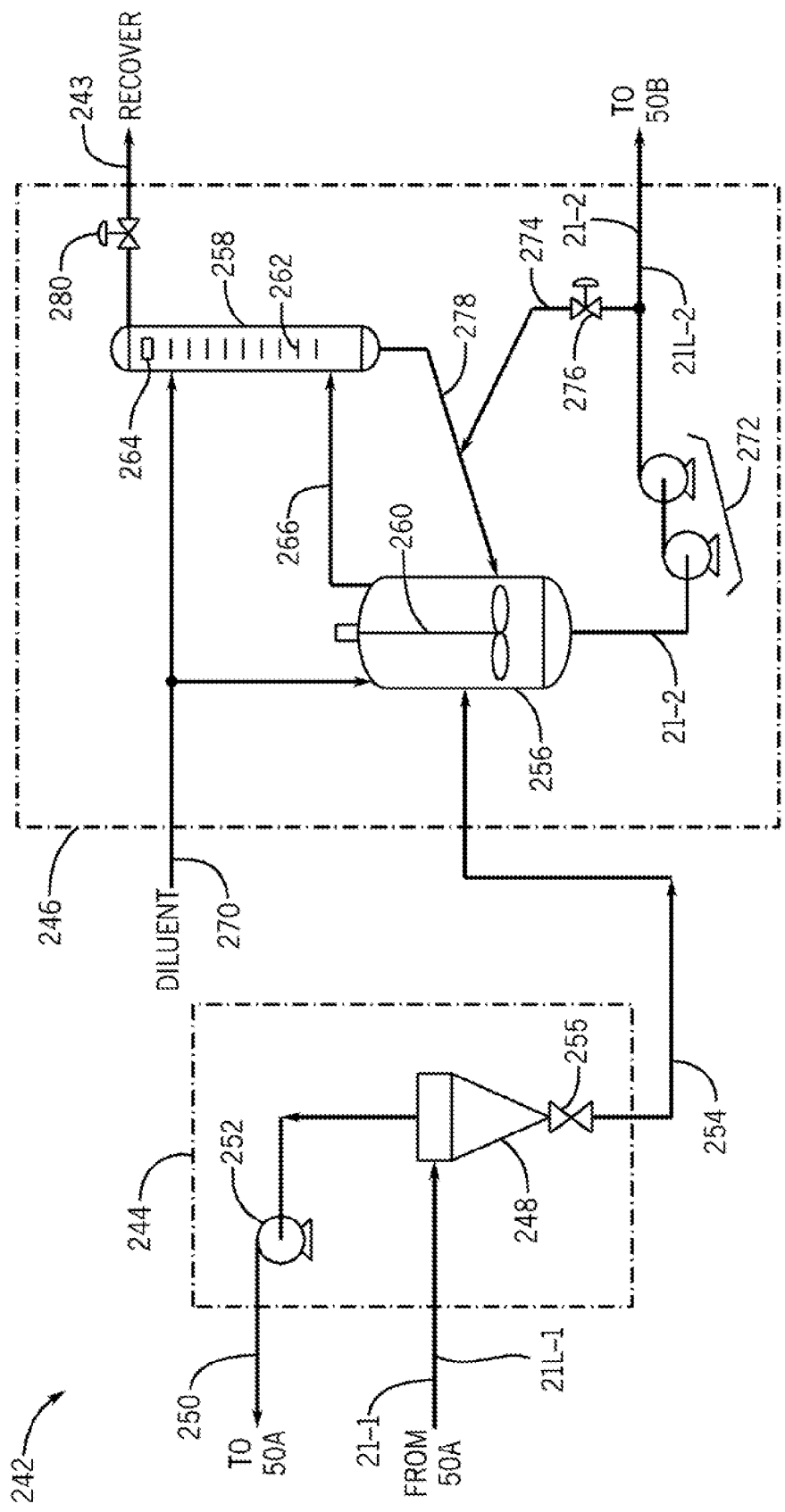
FIG. 11 is a process flow diagram of an exemplary transfer slurry processing system of the alternate reactor system of FIG. 10.

FIG. 11 is an example of a fluff slurry processing system 242 disposed between the first polymerization reactor 50A and the second polymerization reactor 50B. In this example, the slurry processing system 242 has an optional concentrator system 244 and a lights removal system 246. Of course, other configurations of the slurry processing system 242 may be implemented. The aforementioned techniques to control particle size in the first reactor 50A may improve hydraulics and operability of the concentrator system 244, and also improve hydraulics, degassing, and operability of slurries in the lights removal system 246, and so on.

As discussed below, a purpose of the concentrator system 244 may be to form a recycle stream to facilitate control of solids concentration in the first loop reactor 50A. Further, the concentrator system 244 may reduce hydrocarbon (e.g., diluent, monomer, comonomer, etc.) load sent to the lights removal system 246.

As indicated, the concentrator system 244 may be eliminated, and the transfer slurry 21-1 discharged from the first reactor 50A sent to the lights removal system 246 or other slurry treatment system. In certain examples, a continuous take-off (CTO) is employed in lieu of or in addition to the concentrator system 244, and the CTO disposed, for instance, at the discharge of the first reactor 50A on the transfer line 21L-1. The CTO in such examples may provide for concentrating the transfer slurry 21-1 relative to the circulating slurry in the first loop reactor 50A.

In the illustrated embodiment, the transfer line 21L-1 carries the fluff transfer slurry 21-1 discharged from the first polymerization reactor 50A into the hydrocyclone 248 of the concentrator system 244. A recycle stream 250 from the hydrocyclone 248 may be returned via a pump 252 to the first reactor 50A. The recycle stream 250 may include diluent and fine particles of fluff (which may have active catalyst). The flow rate of the recycle stream 250 may be regulated to facilitate control of solids concentration of the slurry circulating in the first loop reactor 50A. The flow rate of the recycle stream 250 may be modulated with a control valve (not shown), and/or by controlling the speed of the pump 250, and so on. As for the primary solids stream from the hydrocyclone 248, a concentrated solids slurry stream 254 exits the hydrocyclone 108 across a pressure let down valve 255 to the light gas removal system 246.

In this example, the lights removal system 246 may remove light components 243 (e.g., hydrogen, ethylene monomer, etc.) from the transfer slurry 21-1 that discharges from the first polymerization reactor 50A. In the case of hydrogen removal, such may be beneficial in bimodal production, for example, where it is desired to maintain a higher concentration of hydrogen in the first reactor 50A than in the second reactor 50B, for instance. Of course, other applications, such as with the monomer (e.g., ethylene), light comonomers, light diluents, non-condensables, and other light components may be realized. In certain examples, a "light" component may be specified as components having a lower boiling point than the diluent (e.g., isobutane) employed in the first loop reactor 50A. Moreover, various applications directed to heavy components (heavy comonomers, additives, etc.) may be realized via recycle from the concentrator system 244 to the first reactor 50A, as well as via discharge of heavier components from the lights removal system 246 (i.e., via the bottom of flash vessel 256, the bottom of fractionation column 258, etc.) to the second reactor 50A in the transfer slurry 21-2, and so forth.

In the illustrated example of FIG. 11, the light gas removal system 246 includes a flash vessel 256 and a distillation or fractionation column 258. In one example, the flash vessel 256 has a jacket (not shown) for a heating medium such as steam, steam condensate, and so forth. In the case of steam, latent heat may be transferred to the contents of the flash vessel 256. The flash vessel 256 may also have a mixer or agitator 260.

The downstream fractionation column 258 may have a plurality of theoretical stages provided by multiple distillation trays 262. In addition, the fractionation column 258 may also have an overhead condenser 264 disposed at the top of the fractionation column 258 in this example. Further, the flash vessel 256, when equipped with the previously referenced jacket, may function as a reboiler for the fractionation column 258. The flash vessel 256 also functions as a stirred tank to collect solids.

In operation, the solids slurry stream 254 from the hydrocyclone 248 enters the flash vessel 256 where hydrocarbon such as diluent, monomer, and comonomer is flashed overhead and sent as feed stream 266 to the fractionation column 258. The pressure of the flash vessel 256 may be maintained, for example, at 50 psi to 300 psi less than the pressure in the first loop reactor 50A. Such an operating pressure in the single-stage flash in the flash vessel 256 in this example may provide for both flashing of some diluent overhead as well as discharge of liquid diluent from the bottom of the flash vessel 256.

In addition to diluent and monomer, the overhead feed stream 266 from the flash vessel 256 to the fractionation column 258 may contain entrained hydrogen if added in the first reactor 50A, as well as some fluff particles including fine particles. Most of the polyethylene fluff particles settle in the flash vessel 256, and discharge from a bottom portion of the flash vessel 256 as the transfer slurry 21-2 (see also FIG. 10). Diluent 270 (e.g., isobutane) may be added to the flash vessel 256.

The transfer slurry 21-2 discharging from the bottom of the flash vessel 256 may be pumped via a series of pumps 272 to the second loop reactor 50B via transfer line 21L-2. A portion 274 of the transfer slurry 21-2 to the second reactor 50B may be recycled to the flash vessel 256 via a flow control valve 276 in the illustrated embodiment. Moreover, in certain examples, the recycled portion 274 may be sampled, and hydrocarbon in the sample tested with a gas chromatograph, for instance, to determine the composition of the hydrocarbon in the transfer slurry 21-2. Such composition test results may be used to facilitate control of the feeds to the reactors 50A, 50B, and component concentrations in the reactors 50A, 50B, and the like.

As for the overhead from flash vessel 256, the feed stream 266 discharges from the flash vessel 256 to the fractionation column 258 where vapor travels up the fractionation column 258. As indicated, a steam jacket on the flash vessel 256 may function as a reboiler by providing heat at the bottom of the fractionation column 256. The vapor moves up the column 258 and most of the diluent and also any heavy comonomer (e.g., 1-hexene) is condensed by the overhead condenser 264 and falls as a liquid along with any scrubbed polyethylene fine particles down to the flash vessel 256 via stream 278. Diluent 270 (e.g., isobutane) may be added to the fractionation column 258.

A light components stream 243 is discharged overhead from the fractionation column 258 through a pressure control valve 276 to a light ends recovery system, for example. The light components stream 243 may be sampled and tested for composition, such as with a gas chromatograph. The composition test results may be used to facilitate control of component concentrations in the reactors 50A, 50B, to adjust flow rates of feed streams to the reactors 50A, 50B, and the like.

The illustrated example of FIG. 11 may provide for more independent control of fluff particle size in the first reactor 50B versus the second reactor 50B in certain cases. For instance, substantially all or a portion of a catalyst activity modifier (inhibitor and/or promoter) added to the first reactor 50A may be recycled to the first reactor 50A via the concentrator system 244, and/or removed in the light components stream 243 if the catalyst activity modifier is a light component, and so forth. In another instance, altering diluent addition to the first reactor 50A to adjust solids concentration or residence time in the first reactor 50A may in some examples be less communicated to the second reactor 50A due to the presence of the slurry processing system 242 intermediate between the first reactor 50A and 50B, and the like.

Additional Disclosure

Methods and systems for the production for polyethylene has been described. The following clauses are offered as further description:

Embodiment A

A method of operating a polyethylene reactor system, comprising: polymerizing ethylene on catalyst in a first polymerization reactor to form intermediate particles having the catalyst and a first polyethylene; discharging the intermediate particles from the first polymerization reactor to a second polymerization reactor; polymerizing ethylene on the catalyst in the intermediate particles in the second polymerization reactor to form product particles having the catalyst, the first polyethylene, and the second polyethylene; discharging the product particles from the second polymerization reactor; and controlling a particle size of the product particles by adjusting a residence time of the catalyst through the first polymerization reactor and/or the second polymerization reactor.

Embodiment B

The method of embodiment A, comprising feeding ethylene, diluent, and the catalyst to the first polymerization reactor, and feeding ethylene and diluent to the second polymerization reactor.

Embodiment C

The method of embodiments A through B, comprising wherein adjusting the residence time comprises adjusting a rate of a diluent feed stream to the first polymerization reactor.

Embodiment D

The method of embodiments A through C, wherein adjusting the residence time comprises adjusting a rate of a diluent feed stream to the second polymerization reactor.

Embodiment E

The method of embodiments A through D, wherein adjusting the residence time comprises adjusting a solids concentration in the first polymerization reactor and/or in the second polymerization reactor.

Embodiment F

The method of embodiments A through E, wherein adjusting the residence time comprises adjusting a first residence time of the catalyst in the first polymerization reactor or adjusting a second residence time of the catalyst in the second polymerization reactor, or adjusting both the first residence time and the second residence time.

Embodiment G

The method of embodiments A through F, wherein adjusting the first residence time comprises adjusting a rate of a diluent feed stream to the first polymerization reactor.

Embodiment H

The method of embodiments A through G, wherein adjusting the second residence time comprises adjusting a rate of a first diluent feed stream to the first polymerization reactor and/or adjusting a rate of a second diluent feed stream to the second polymerization reactor.

Embodiment I

The method of embodiments A through H, wherein adjusting the first residence time comprises adjusting solids concentration in the first polymerization reactor, and wherein adjusting the second residence time comprises adjusting solids concentration in the second polymerization reactor.

Embodiment J

The method of embodiments A through I, wherein the first polymerization reactor and the second polymerization reactor each comprise a liquid-phase reactor.

Embodiment K

The method of embodiments A through J, wherein the first polymerization reactor and the second polymerization reactor each comprise a loop reactor.

Embodiment L

The method of embodiments A through K, comprising further controlling the particle size of the product particles by adjusting activity of the catalyst in the first polymerization reactor and/or in the second polymerization reactor.

Embodiment M

The method of embodiments A through L, wherein adjusting activity comprises adding an activity inhibitor to the first polymerization reactor and/or to the second polymerization reactor.

Embodiment N

The method of embodiments A through M, wherein the activity inhibitor comprises a catalyst poison.

Embodiment O

The method of embodiments A through N, comprising selecting an alternative catalyst and feeding the alternative catalyst to the first polymerization reactor to give alternative product particles discharging from the second polymerization reactor, the alternative product particles comprising a different mean particle size than the product particles.

Embodiment P

The method of embodiments A through O, comprising feeding more hydrogen to the first polymerization reactor than to the second polymerization reactor, or feeding more hydrogen to the second polymerization reactor than to the first polymerization reactor.

Embodiment Q

The method of embodiments A through P, comprising feeding comonomer to the first polymerization reactor and/or to the second polymerization reactor.

Embodiment R

The method of embodiments A through Q, wherein the comonomer comprises propylene, butene, 1-pentene, 1-hexene, 1-octene, and/or 1-decene.

Embodiment S

The method of embodiments A through R, comprising feeding more comonomer to the first polymerization reactor than to the second polymerization reactor, or feeding more comonomer to the second polymerization reactor than to the first polymerization reactor.

Embodiment T

The method of embodiments A through S, wherein the first polyethylene and the second polyethylene combine to give a monomodal polyethylene or a bimodal polyethylene.

Embodiment U

A method of operating a polyethylene reactor system, comprising: polymerizing ethylene on a catalyst in a first polymerization reactor to form a first polyethylene and to form intermediate polyethylene particles comprising the catalyst and the first polyethylene; discharging the intermediate polyethylene particles from the first polymerization reactor to a second polymerization reactor, polymerizing ethylene on the catalyst in the second polymerization reactor to form a second polyethylene and to form product polyethylene particles comprising the catalyst, the first polyethylene, and the second polyethylene; discharging the product polyethylene particles from the second polymerization reactor; and controlling a particle size of the product polyethylene particles by adjusting activity of the catalyst in the first polymerization reactor and/or in the second polymerization reactor.

Embodiment V

The method of embodiment U, wherein adjusting activity comprises adding an activity inhibitor to the first polymerization reactor and/or to the second polymerization reactor.

Embodiment W

The method of embodiments U through V, wherein the activity inhibitor comprises a catalyst poison.

Embodiment X

The method of embodiments U through W, wherein controlling the particle size of the product polyethylene particles further comprises selecting an alternative catalyst and feeding the alternative catalyst to the first polymerization reactor.

Embodiment Y

The method of embodiments U through X, comprising feeding more hydrogen to the first polymerization reactor than to the second polymerization reactor, or feeding more hydrogen to the second polymerization reactor than to the first polymerization reactor.

Embodiment Z

The method of embodiments U through Y comprising further controlling a particle size of the product particles by adjusting a residence time of the catalyst through the first polymerization reactor and/or the second polymerization reactor.

Embodiment AA

The method of embodiments U through Z, wherein adjusting the residence time comprises adjusting a rate of a diluent feed stream to the first polymerization reactor.

Embodiment AB

The method of embodiments U through AA, wherein adjusting the residence time comprises adjusting a rate of a diluent feed stream to the second polymerization reactor.

Embodiment AC

The method of embodiments U through AB, wherein adjusting the residence time comprises adjusting a solids concentration in the first polymerization reactor and/or in the second polymerization reactor.

Embodiment AD

The method of embodiments U through AC, wherein adjusting the residence time comprises adjusting a first residence time of the catalyst in the first polymerization reactor or adjusting a second residence time of the catalyst in the second polymerization reactor, or adjusting both the first residence time and the second residence time.

Embodiment AE

A method of increasing efficiency of separating residual hydrocarbon from polyethylene particles in a purge vessel, comprising: polymerizing ethylene on a catalyst in a reactor system to form polyethylene particles, the reactor system comprising a first polymerization reactor and a second polymerization reactor in series; discharging the polyethylene particles from the second polymerization reactor to a separation vessel to separate hydrocarbon from the polyethylene particles; discharging the polyethylene particles from the flash vessel to a purge vessel to separate residual hydrocarbon from the polyethylene particles; and adjusting a particle size of the polyethylene particles discharging from the second polymerization reactor to increase separation of residual hydrocarbon from polyethylene particles in a downstream purge vessel.

Embodiment AF

The method of embodiment AE, wherein adjusting the particle size comprises adjusting particle size of fractured polyethylene particles in the reactor system.

Embodiment AG

The method of embodiments AE through AF, wherein adjusting the particle size comprises adjusting productivity of the catalyst in the reactor system.

Embodiment AH

The method of embodiments AE through AG, wherein adjusting the productivity comprises adjusting a first productivity of the catalyst in the first polymerization reactor or adjusting a second productivity of the catalyst in the second polymerization reactor, or adjusting both the first productivity and the second productivity.

Embodiment AI

The method of embodiments AE through AH, wherein adjusting the productivity comprises adding an activity inhibitor to the first polymerization reactor or the second polymerization reactor or both.

Embodiment AJ

The method of embodiments AE through AL, wherein adjusting the productivity comprises adjusting residence time of the catalyst in the reactor system.

Embodiment AK

The method of embodiments AE through AJ, wherein adjusting the particle size comprises adjusting residence time of the catalyst in the reactor system.

Embodiment AL

The method of embodiments AE through AK, wherein adjusting the particle size comprises adjusting a first residence time of the catalyst in the first polymerization reactor or adjusting a second residence time of the catalyst in the second polymerization reactor, or adjusting both the first residence time and the second residence time.

Embodiment AM

The method of embodiments AE through AL, wherein discharging the polyethylene particles from the second polymerization reactor comprises discharging continuously the polyethylene particles from the second polymerization reactor.

Embodiment AN

The method of embodiments AE through AM, wherein adjusting the particle size comprises selecting and feeding an alternative catalyst having a catalyst particle density to give a desired amount of fracturing of the polyethylene fluff particles in the reactor system.

What is claimed is:

1. A method of operating a polyethylene reactor system, the method comprising:
    polymerizing ethylene on a catalyst in a first polymerization reactor to form intermediate particles having the catalyst and a first polyethylene;
    discharging the intermediate particles from the first polymerization reactor to a second polymerization reactor;
    polymerizing ethylene on the catalyst in the intermediate particles in the second polymerization reactor to form product particles having the catalyst, the first polyethylene, and the second polyethylene;
    discharging the product particles from the second polymerization reactor; and
    controlling a particle size of the product particles by adjusting a residence time of the catalyst through the first polymerization reactor and/or the second polymerization reactor,
    wherein adjusting the residence time of the catalyst comprises adjusting a rate of a diluent feed stream to the first polymerization reactor.

2. The method of claim 1, comprising feeding ethylene, diluent, and the catalyst to the first polymerization reactor, and feeding ethylene and diluent to the second polymerization reactor.

3. The method of claim 1, wherein adjusting the residence time of the catalyst comprises adjusting a rate of a diluent feed stream to the second polymerization reactor.

4. The method of claim 1, wherein adjusting the residence time comprises adjusting a solids concentration in the first polymerization reactor and/or in the second polymerization reactor.

5. The method of claim 1, wherein adjusting the residence time comprises adjusting a first residence time of the catalyst in the first polymerization reactor or adjusting a second residence time of the catalyst in the second polymerization reactor, or adjusting both the first residence time and the second residence time.

6. The method of claim 5, wherein adjusting the first residence time comprises adjusting a rate of a diluent feed stream to the first polymerization reactor.

7. The method of claim 5, wherein adjusting the second residence time comprises adjusting a rate of a first diluent feed stream to the first polymerization reactor and/or adjusting a rate of a second diluent feed stream to the second polymerization reactor.

8. The method of claim 5, wherein adjusting the first residence time comprises adjusting solids concentration in the first polymerization reactor, and wherein adjusting the second residence time comprises adjusting solids concentration in the second polymerization reactor.

9. The method of claim 1, wherein the first polymerization reactor and the second polymerization reactor each comprise a liquid-phase reactor.

10. The method of claim 1, wherein the first polymerization reactor and the second polymerization reactor each comprise a loop reactor.

11. The method of claim 1, comprising further controlling the particle size of the product particles by adjusting activity of the catalyst in the first polymerization reactor and/or in the second polymerization reactor.

12. The method of claim 11, wherein adjusting activity comprises adding an activity inhibitor to the first polymerization reactor and/or to the second polymerization reactor.

13. The method of claim 12, wherein the activity inhibitor comprises a catalyst poison.

14. The method of claim 1, comprising selecting an alternative catalyst and feeding the alternative catalyst to the first polymerization reactor to give alternative product particles discharging from the second polymerization reactor, the alternative product particles comprising a different mean particle size than the product particles.

15. The method of claim 1, comprising feeding more hydrogen to the first polymerization reactor than to the second polymerization reactor, or feeding more hydrogen to the second polymerization reactor than to the first polymerization reactor.

16. The method of claim 1, comprising feeding comonomer to the first polymerization reactor and/or to the second polymerization reactor.

17. The method of claim 16, wherein the comonomer comprises propylene, butene, 1-pentene, 1-hexene, 1-octene, and/or 1-decene.

18. The method of claim 1, comprising feeding more comonomer to the first polymerization reactor than to the second polymerization reactor, or feeding more comonomer to the second polymerization reactor than to the first polymerization reactor.

19. The method of claim 1, wherein the first polyethylene and the second polyethylene combine to give a monomodal polyethylene or a bimodal polyethylene.

20. A method of operating a polyethylene reactor system, the method comprising:
polymerizing ethylene on a catalyst in a first polymerization reactor to form a first polyethylene and to form intermediate polyethylene particles comprising the catalyst and the first polyethylene;
discharging the intermediate polyethylene particles from the first polymerization reactor to a second polymerization reactor;
polymerizing ethylene on the catalyst in the second polymerization reactor to form a second polyethylene and to form product polyethylene particles comprising the catalyst, the first polyethylene, and the second polyethylene;
discharging the product polyethylene particles from the second polymerization reactor; and
controlling a particle size of the product polyethylene particles by adjusting activity of the catalyst in the first polymerization reactor and/or in the second polymerization reactor,
wherein adjusting activity comprises adding an activity inhibitor to the first polymerization reactor and/or to the second polymerization reactor.

21. The method of claim 20, wherein the activity inhibitor comprises a catalyst poison.

22. The method of claim 20, wherein controlling the particle size of the product polyethylene particles further comprises selecting an alternative catalyst and feeding the alternative catalyst to the first polymerization reactor.

23. The method of claim 20, comprising feeding more hydrogen to the first polymerization reactor than to the second polymerization reactor, or feeding more hydrogen to the second polymerization reactor than to the first polymerization reactor.

24. The method of claim 20, comprising further controlling a particle size of the product particles by adjusting a residence time of the catalyst through the first polymerization reactor and/or the second polymerization reactor.

25. The method of claim 24, wherein adjusting the residence time comprises adjusting a rate of a diluent feed stream to the first polymerization reactor.

26. The method of claim 24, wherein adjusting the residence time comprises adjusting a rate of a diluent feed stream to the second polymerization reactor.

27. The method of claim 24, wherein adjusting the residence time comprises adjusting a solids concentration in the first polymerization reactor and/or in the second polymerization reactor.

28. The method of claim 24, wherein adjusting the residence time comprises adjusting a first residence time of the catalyst in the first polymerization reactor or adjusting a second residence time of the catalyst in the second polymerization reactor, or adjusting both the first residence time and the second residence time.

29. The method of claim 20, wherein adjusting activity comprises adjusting temperature in the first polymerization reactor and/or the second polymerization reactor.

30. A method of increasing efficiency of separating residual hydrocarbon from polyethylene particles in a purge vessel, comprising:
polymerizing ethylene on a catalyst in a reactor system to form polyethylene particles, the reactor system comprising a first polymerization reactor and a second polymerization reactor in series;
discharging the polyethylene particles from the second polymerization reactor to a separation vessel to separate hydrocarbon from the polyethylene particles;
discharging the polyethylene particles from the separation vessel to a purge vessel to separate residual hydrocarbon from the polyethylene particles; and
adjusting a particle size of the polyethylene particles discharging from the second polymerization reactor to increase separation of residual hydrocarbon from polyethylene particles in a downstream purge vessel,
wherein adjusting the particle size comprises adjusting productivity of the catalyst in the reactor system, and
wherein adjusting the productivity comprises adding an activity inhibitor to the first polymerization reactor, the second polymerization reactor, or both the first polymerization reactor and the second polymerization reactor.

31. The method of claim 30, wherein adjusting the particle size comprises adjusting particle size of fractured polyethylene particles in the reactor system.

32. The method of claim 30, wherein adjusting the productivity comprises adjusting a first productivity of the catalyst in the first polymerization reactor or adjusting a second productivity of the catalyst in the second polymerization reactor, or adjusting both the first productivity and the second productivity.

33. The method of claim 30, wherein adjusting the productivity comprises adjusting residence time of the catalyst in the reactor system.

34. The method of claim 30, wherein adjusting the particle size comprises adjusting residence time of the catalyst in the reactor system.

35. The method of claim 30, wherein adjusting the particle size comprises adjusting a first residence time of the catalyst in the first polymerization reactor or adjusting a second residence time of the catalyst in the second polymerization reactor, or adjusting both the first residence time and the second residence time.

36. The method of claim 30, wherein discharging the polyethylene particles from the second polymerization reactor comprises discharging continuously the polyethylene particles from the second polymerization reactor.

37. The method of claim 30, wherein adjusting the particle size comprises selecting and feeding an alternative catalyst having a catalyst particle density to give a desired amount of fracturing of the polyethylene fluff particles in the reactor system.

38. The method of claim 30, wherein adjusting the particle size comprises adjusting temperature in the first polymerization reactor and/or second polymerization reactor.

* * * * *